(12) United States Patent
Bayesteh et al.

(10) Patent No.: US 9,166,663 B2
(45) Date of Patent: Oct. 20, 2015

(54) SYSTEM AND METHOD FOR OPEN-LOOP MIMO COMMUNICATIONS IN A SCMA COMMUNICATIONS SYSTEM

(71) Applicant: FutureWei Technologies, Inc., Plano, TX (US)

(72) Inventors: Alireza Bayesteh, Ottawa (CA); Hosein Nikopour, Ottawa (CA); Jianglei Ma, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/035,996

(22) Filed: Sep. 25, 2013

(65) Prior Publication Data

US 2014/0169408 A1    Jun. 19, 2014

Related U.S. Application Data

(60) Provisional application No. 61/737,338, filed on Dec. 14, 2012.

(51) Int. Cl.
| | |
|---|---|
| *H04L 27/00* | (2006.01) |
| *H04B 7/04* | (2006.01) |
| *H04L 25/03* | (2006.01) |
| *H04B 7/02* | (2006.01) |
| *H04B 7/06* | (2006.01) |

(52) U.S. Cl.
CPC ........ *H04B 7/0473* (2013.01); *H04L 25/03898* (2013.01); *H04B 7/024* (2013.01); *H04B 7/0452* (2013.01); *H04B 7/0669* (2013.01)

(58) Field of Classification Search
USPC ......................................... 375/144, 295–296
See application file for complete search history.

(56) References Cited

U.S. PATENT DOCUMENTS

| | | | |
|---|---|---|---|
| 6,952,439 B1 | 10/2005 | Lindsey et al. | |
| 2004/0120274 A1* | 6/2004 | Petre et al. | 370/320 |
| 2005/0265280 A1* | 12/2005 | Roh et al. | 370/328 |
| 2010/0118997 A1* | 5/2010 | Lee et al. | 375/260 |
| 2011/0170575 A1* | 7/2011 | Harrison et al. | 375/146 |

(Continued)

FOREIGN PATENT DOCUMENTS

| | | |
|---|---|---|
| CN | 1455524 A | 11/2003 |
| CN | 101009534 A | 8/2007 |
| CN | 101483449 A | 7/2009 |

OTHER PUBLICATIONS

Boutros, J., et al., "Good Lattice Constellatins for Both Rayleigh Fading and Gaussian Channels," IEEE Transactions on Information Theory, vol. 42, No. 2, Mar. 1996, pp. 502-518.

(Continued)

*Primary Examiner* — Dac Ha
*Assistant Examiner* — Janice Tieu
(74) *Attorney, Agent, or Firm* — Slater & Matsil, L.L.P.

(57) ABSTRACT

A method for transmitting data includes mapping a first coded information bit stream intended for a first transmit antenna onto at least one first spreading sequence of a plurality of first spreading sequences to generate a first data stream, mapping a second coded information bit stream intended for a second transmit antenna onto at least one second spreading sequence of a plurality of second spreading sequences to generate a second data stream. The method also includes transmitting the first data stream and the second data stream on respective transmit antennas.

34 Claims, 27 Drawing Sheets

(56) References Cited

U.S. PATENT DOCUMENTS

2011/0310994 A1* 12/2011 Ko et al. ............... 375/295
2014/0140360 A1   5/2014 Nikopour et al.

OTHER PUBLICATIONS

Boutros, J., et al., "Signal Space Diversity: A Power-and Bandwidth-Efficient Diversity Technique for the Rayleigh Fading Channel," IEEE Transactions on Information Theory, vol. 44, No. 4, Jul. 1998, pp. 1453-1467.

Viterbo, E., et al., "A Universal Lattice Code Decoder for Fading Channels," IEEE Transactions on Information Theory, vol. 45, No. 5, Jul. 1999, pp. 1639-1642.

International Search Report of Patent Cooperation Treaty (PCT), International Application No. PCT/CN2013/089397, Applicant: Huawei Technologies Co., Ltd., Mar. 13, 2014, 16 pages.

Foschini, G., "Layered Space-Time Architecture for Wireless Communication in a Fading Environment When Using Multi-element Antennas," Bell Labs Technical Journal, vol. 1, Issue 2, Autumn 1996, pp. 41-59.

* cited by examiner

SYSTEM AND METHOD FOR OPEN-LOOP MIMO COMMUNICATIONS IN A SCMA COMMUNICATIONS SYSTEM

This application claims the benefit of U.S. Provisional Application No. 61/737,338, filed on Dec. 14, 2012, entitled "Methods for Open-Loop MIMO Transmission and Reception for SCMA OFDM Modulation," which application is hereby incorporated herein by reference.

TECHNICAL FIELD

The present disclosure relates generally to digital communications, and more particularly to a system and method for open-loop multiple input, multiple output (MIMO) communications in a sparse code multiple access (SCMA) communications system.

BACKGROUND

Code division multiple access (CDMA) is a multiple access technique in which data symbols are spread out over orthogonal and/or near orthogonal code sequences. Traditional CDMA encoding is a two step process in which a binary code is mapped to a quadrature amplitude modulation (QAM) symbol before a spreading sequence is applied. While traditional CDMA encoding can provide relatively high data rates, new techniques/mechanisms for achieving even higher data rates are needed to meet the ever-growing demands of next-generation wireless networks. Low density spreading (LDS) is a form of CDMA used for multiplexing different layers of data. LDS uses repetitions of the same symbol on layer-specific nonzero position in time or frequency. As an example, in LDS-orthogonal frequency division multiplexing (OFDM) a constellation point is repeated (with some possible phase rotations) over nonzero frequency tones of a LDS block. Sparse code multiple access (SCMA) is a generalization of LDS where a multidimensional codebook is used to spread data over tones without necessarily repeating symbols.

SUMMARY OF THE DISCLOSURE

Example embodiments of the present disclosure which provide a system and method for open-loop MIMO communications in a SCMA communications system.

In accordance with an example embodiment of the present disclosure, a method for transmitting data is provided. The method mapping, by a transmitting device, a first coded information bit stream intended for a first transmit antenna onto at least one first spreading sequence of a plurality of first spreading sequences to generate a first data stream, and mapping, by the transmitting device, a second coded information bit stream intended for a second transmit antenna onto at least one second spreading sequence of a plurality of second spreading sequences to generate a second data stream. The method also includes transmitting, by the transmitting device, the first data stream and the second data stream on respective transmit antennas.

In accordance with another example embodiment of the present disclosure, a method for receiving data in a communications system is provided. The method includes determining, by a receiving device, a first plurality of codebooks and a second plurality of codebooks, wherein the first plurality of codebooks and the second plurality of codebooks are associated with a transmitting device transmitting user data to the receiving device, and receiving, by the receiving device, a signal carrying output codewords communicated over shared resources of the communications system, wherein each of the output codewords includes a plurality of codewords, wherein each of the plurality of codewords belongs to a different one of the plurality of codebooks, and wherein each of the plurality of codebooks is associated with a different one of a plurality of data layers. The method also includes processing, by the receiving device, the signal using the first plurality of codebooks and the second plurality of codebooks in all of the plurality of data layers to recover the user data.

In accordance with another example embodiment of the present disclosure, a method for transmitting data is provided. The method includes mapping, by a transmitting device, a coded information bit stream intended for a transmit antenna onto at least one spreading sequence of a plurality of spreading sequences to produce a data stream, and encoding, by the transmitting device, the data stream using a space-time code to produce a symbol block. The method also includes transmitting, by the transmitting device, the symbol block.

In accordance with another example embodiment of the present disclosure, a method for receiving data is provided. The method includes receiving, by the receiving device, a symbol block from a transmitting device transmitting data to the receiving device, and processing, by the receiving device, the symbol block using a space-time code and a plurality of codebooks associated with the transmitting device to recover the data.

In accordance with another example embodiment of the present disclosure, a transmitting device is provided. The transmitting device includes a processor, and a transmitter operatively coupled to the processor. The processor maps a first coded information bit stream intended for a first transmit antenna onto at least one first spreading sequence of a plurality of first spreading sequences to generate a first data stream, and maps a second coded information bit stream intended for a second transmit antenna onto at least one second spreading sequence of a plurality of second spreading sequences to generate a second data stream. The transmitter transmits the first data stream and the second data stream on respective transmit antennas.

In accordance with another example embodiment of the present disclosure, a receiving device is provided. The receiving device includes a processor, and a receiver operatively coupled to the processor. The processor determines a first plurality of codebooks and a second plurality of codebooks, wherein the first plurality of codebooks and the second plurality of codebooks are associated with a transmitting device transmitting user data to the receiving device, and recovers a signal using the first plurality of codebooks and the second plurality of codebooks in all of a plurality of data layers to recover the user data, the signal carrying output codewords communicated over shared resources of a communications system, wherein each of the output codewords includes a plurality of codewords, wherein each of the plurality of codewords belongs to a different one of the plurality of codebooks, and wherein each of the plurality of codebooks is associated with a different one of the plurality of data layers. The receiver receives the signal.

One advantage of an embodiment is that increased spectral efficiency is achieved by combining SCMA with MIMO. Therefore, higher data rates may be supported.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

Figure 1:
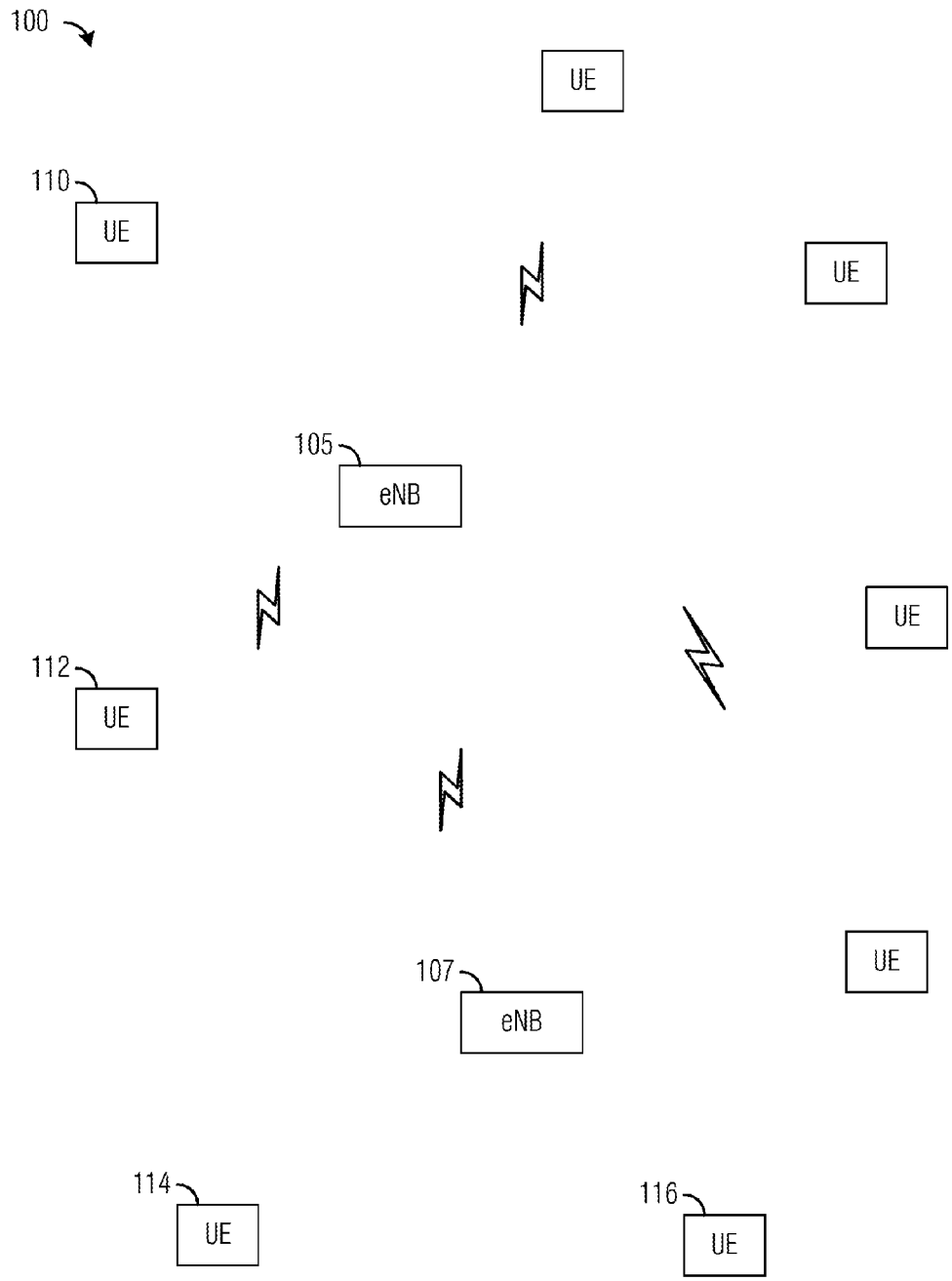
FIG. 1 illustrates an example communications system according to example embodiments described herein.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to open-loop MIMO communications in a SCMA communications system. For example, a transmitting device maps a first coded information bit stream intended for a first transmit antenna onto at least one first spreading sequence of a plurality of first spreading sequences to generate a first data stream, maps a second coded information bit stream intended for a second transmit antenna onto at least one second spreading sequence of a plurality of second spreading sequences to generate a second data stream, and transmits the first data stream and the second data stream on respective transmit antennas. As another example, a receiving device determines a first plurality of codebooks and a second plurality of codebooks, wherein the first plurality of codebooks and the second plurality of codebooks are associated with a transmitting device transmitting user data to the receiving device, receives a signal carrying output codewords communicated over shared resources of the communications system, wherein each of the output codewords includes a plurality of codewords, wherein each of the plurality of codewords belongs to a different one of the plurality of codebooks, and wherein each of the plurality of codebooks is associated with a different one of a plurality of data layers, and processes the signal using the first plurality of codebooks and the second plurality of codebooks in all of the plurality of data layers to recover the user data.

The present disclosure will be described with respect to example embodiments in a specific context, namely a SCMA communications system that supports MIMO to increase spectral efficiency. The disclosure may also be applied, however, to standards compliant and non-standards compliant SCMA communications systems that support MIMO to increase spectral efficiency.

SCMA is an encoding technique that encodes data streams, such as binary data streams, or in general, M-ary data streams, where M is an integer number greater than or equal to 2) into multidimensional codewords. SCMA directly encodes the data stream into multidimensional codewords and circumvents quadrature amplitude modulation (QAM) symbol mapping, which may lead to coding gain over conventional CDMA encoding. Notably, SCMA encoding techniques convey data streams using a multidimensional codeword rather than a QAM symbol.

Additionally, SCMA encoding provides multiple access through the use of different codebooks for different multiplexed layers, as opposed to the use of different spreading sequences for difference multiplexed layers, e.g., a LDS signatures in LDS, as is common in conventional CDMA encoding. Furthermore, SCMA encoding typically uses codebooks with sparse codewords that enable receivers to use low complexity algorithms, such as message passing algorithms (MPA), to detect respective codewords from combined codewords received by the receiver, thereby reducing processing complexity in the receivers.

FIG. 1 illustrates a communications system 100. Communications system 100 may support SCMA communications. Communications system 100 includes an enhanced NodeB (eNB) 105, as well as eNB 107, serving a plurality of user equipments (UE). eNB 105 may be an example of a communications controller, which may also be referred to as a controller, a base station, a NodeB, and the like. UEs may be examples of communicating devices, which may also be referred to as mobile stations, terminals, users, subscribers, and the like. eNBs 105 and 107 may include multiple transmit antennas and multiple receive antennas to facilitate MIMO operation, wherein a single eNB may simultaneously transmit multiple data streams to multiple users, a single user also with multiple receive antennas, or a combination thereof. Similarly, the UEs may include multiple transmit antennas and multiple receive antennas to support MIMO operation. It is noted that although shown in FIG. 1 as being a single entity with multiple transmit antennas, eNBs with multiple transmit antennas may have their transmit antennas located at a single device or distributed across multiple devices. In a distributed situation, an eNB may control the operation of the distributed devices. The same may be true for UEs with multiple transmit antennas. When a single device is capable of simultaneously transmitting to multiple users, the single device may be referred to as operating in a multiple user MIMO (MU-MIMO) mode.

While it is understood that communications systems may employ multiple eNBs capable of communicating with a number of UEs, only two eNBs, and a number of UEs are illustrated for simplicity.

Figure 2:
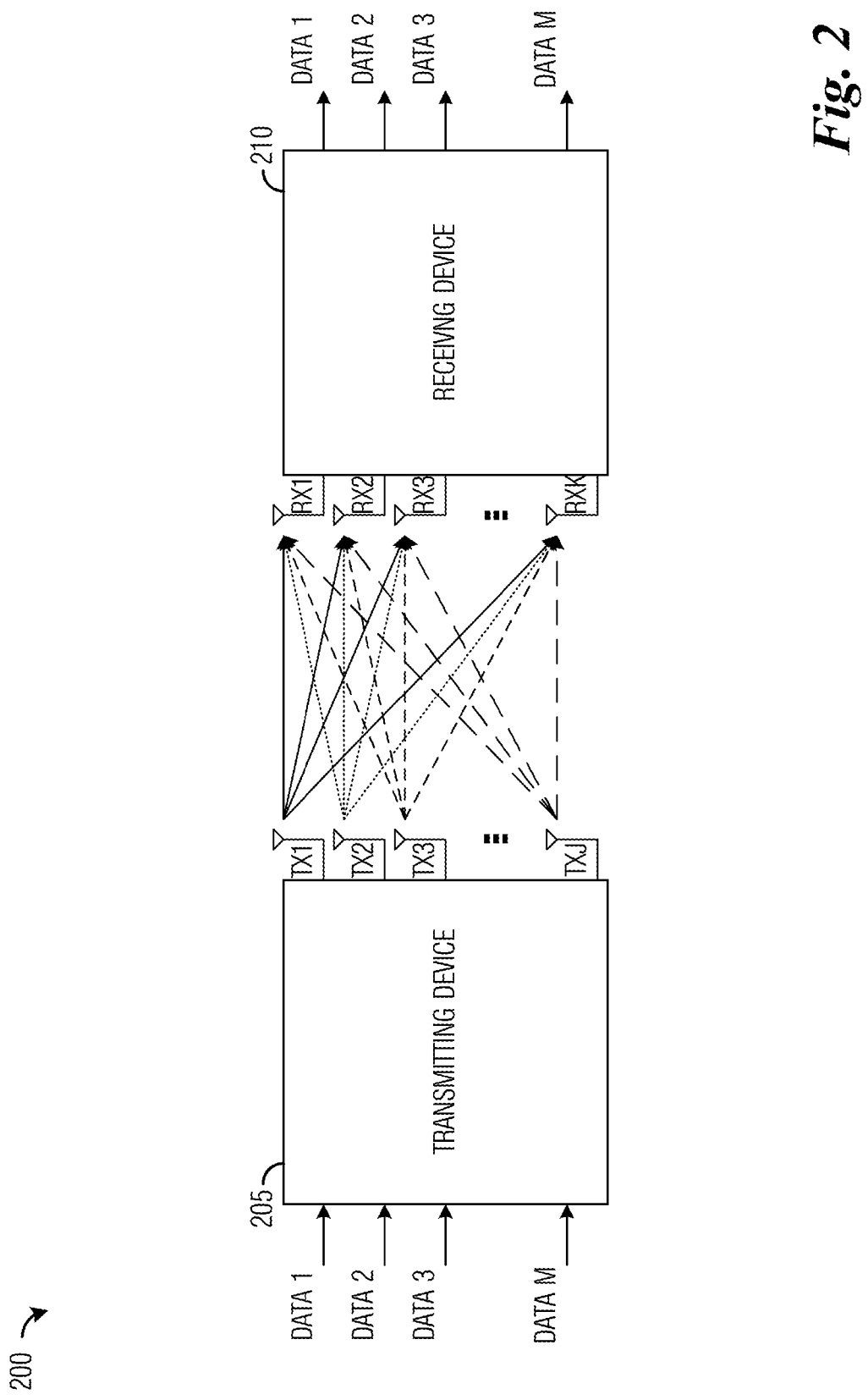
FIG. 2 illustrates an example communications system highlighting a transmitting device and receiving device according to example embodiments described herein.

FIG. 2 illustrates a communications system 200 highlighting a transmitting device 205 and receiving device 210. In general, a transmitting device may refer to an eNB making a downlink transmission to a UE or a UE making an uplink transmission to an eNB, and a receiving device may refer to a UE receiving a downlink transmission from an eNB or an eNB receiving an uplink transmission from a UE. Transmitting device 205 has J transmit antennas (shown as $TX_1$ through $TX_J$) while receiving device 210 has K receive antennas (shown as $RX_1$ through $RX_K$), where J and K are integer numbers greater than or equal to 1 (however, for MIMO transmission, J and K are generally greater than or equal to 2). As shown in FIG. 2, transmitting device 205 has as input M data streams, where M is an integer number greater than or equal to 1, that are transmitted over the K transmit antenna to receiving device 210. Receiving device 210 decodes the received signal to reconstruct the M data streams. It is noted that the transmission of M data streams to a single receiving device is intended for illustrative purposes only, since with J transmit antenna, transmitting device 205 may transmit to up to M receiving devices.

Figure 3:
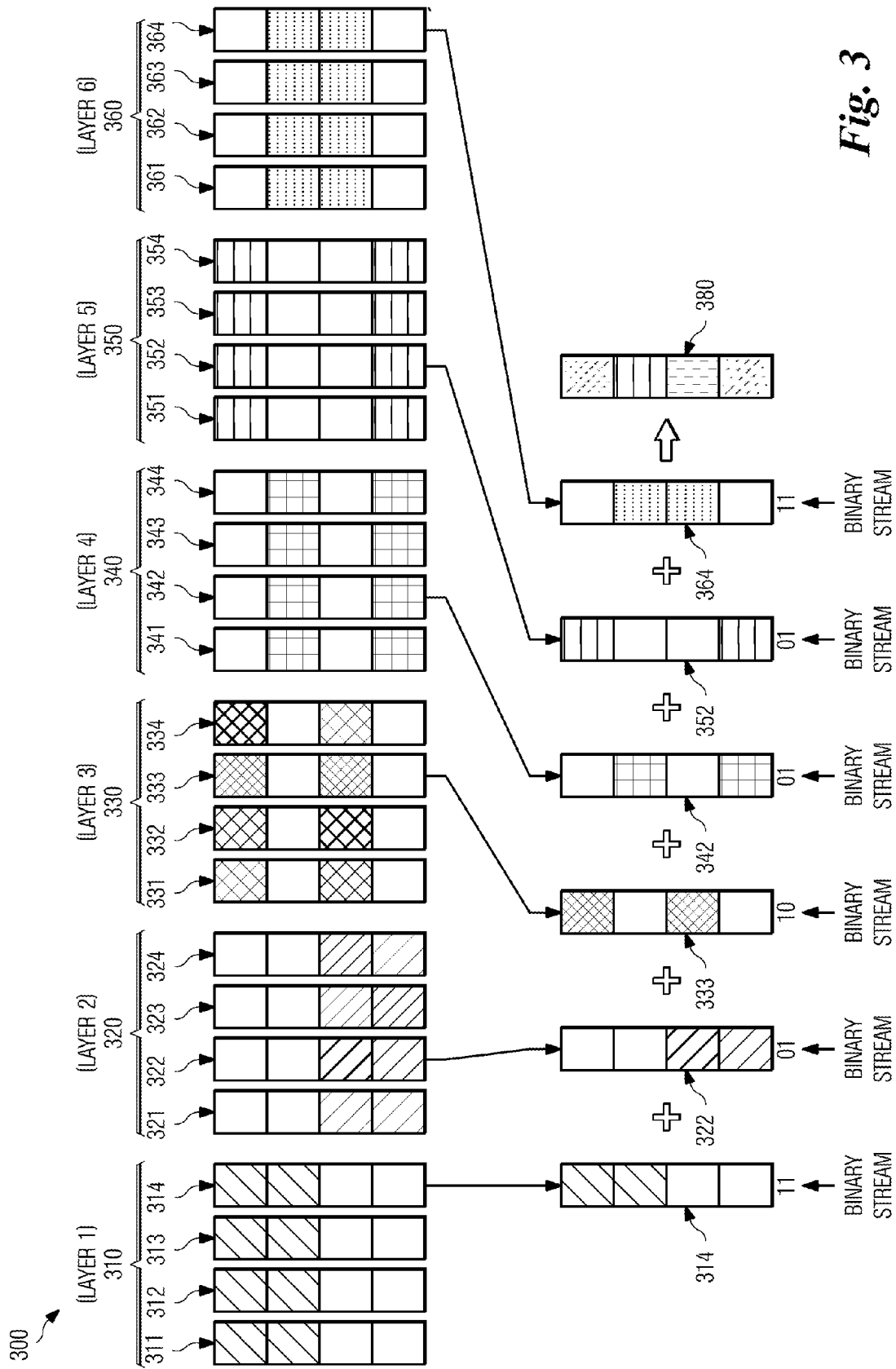
FIG. 3 illustrates an example SCMA multiplexing scheme for encoding data according to example embodiments described herein.

FIG. 3 illustrates an example SCMA multiplexing scheme 300 for encoding data. As shown in FIG. 3, SCMA multiplexing scheme 300 may utilize a plurality of codebooks, such as codebook 310, codebook 320, codebook 330, codebook 340, codebook 350, and codebook 360. Each codebook of the plurality of codebooks is assigned to a different multiplexed layer. Each codebook includes a plurality of multidimensional codewords (or spreading sequences). It is noted that in LDS, the multidimensional codewords are low density sequence signatures. More specifically, codebook 310 includes codewords 311-314, codebook 320 includes codewords 321-324, codebook 330 includes codewords 331-334, codebook 340 includes codewords 341-344, codebook 350 includes codewords 351-354, and codebook 360 includes codewords 361-364.

Each codeword of a respective codebook may be mapped to a different data, e.g., binary, value. As an illustrative example, codewords 311, 321, 331, 341, 351, and 361 are mapped to binary value '00', the codewords 312, 322, 332, 342, 352, and 362 are mapped to the binary value '01', the codewords 313, 323, 333, 343, 353, and 363 are mapped to the binary value '10', and the codewords 314, 324, 334, 344, 354, and 364 are mapped to the binary value '11'. It is noted that although the codebooks in FIG. 3 are depicted as having four codewords each, SCMA codebooks in general may have any number of codewords. As an example, SCMA codebooks may have 8 codewords (e.g., mapped to binary values '000' . . . '111'), 16 codewords (e.g., mapped to binary values '0000' . . . '1111'), or more.

As shown in FIG. 3, different codewords are selected from various codebooks 310, 320, 330, 340, 350, and 360 depending on the binary data being transmitted over the multiplexed layer. In this example, codeword 314 is selected from codebook 310 because the binary value '11' is being transmitted over the first multiplexed layer, codeword 322 is selected from codebook 320 because the binary value '01' is being transmitted over the second multiplexed layer, codeword 333 is selected from codebook 330 because the binary value '10' is being transmitted over the third multiplexed layer, codeword 342 is selected from codebook 340 because the binary value '01' is being transmitted over the fourth multiplexed layer, codeword 352 is selected from codebook 350 because the binary value '01' is being transmitted over the fifth multiplexed layer, and codeword 364 is selected from codebook 360 because the binary value '11' is being transmitted over the sixth multiplexed layer. Codewords 314, 322, 333, 342, 352, and 364 may then be multiplexed together to form multiplexed data stream 380, which is transmitted over shared resources of a network. Notably, codewords 314, 322, 333, 342, 352, and 364 are sparse codewords, and therefore can be identified upon reception of multiplexed data stream 380 using a low complexity algorithm, such as a message passing algorithm (MPA) or a turbo decoder.

According to an example embodiment, it is possible to combine SCMA modulation with MIMO to improve spectral efficiency. A variety of MIMO transmission and reception techniques for SCMA orthogonal frequency division multiplex (OFDM) modulation are provided, including: MIMO for code-space multiplexing (CSM) with open-loop single user (SU) and multi-user (MU) MIMO techniques with spreading in multi-carrier time and/or frequency domain; open-loop MIMO techniques for inter-transmit point (TP) and intra-TP interference coordination including CSM with signature and/or codebook coordination and/or coordinated beam forming (CBF)/CSM; and MIMO for transmit diversity including block-wise space-time coding (e.g., Alamouti technique) combined with SCMA to achieved double domain diversity (space and time and/or frequency domains). The combination of SCMA modulation with MIMO provides advantages over conventional techniques, such as code-domain multiplexing (e.g., code division multiple access, low density signatures, SCMA, and the like), multicarrier modulation (e.g., OFDM), open-loop MIMO schemes, coordinated multi-point (CoMP), and the like.

Figure 4A:
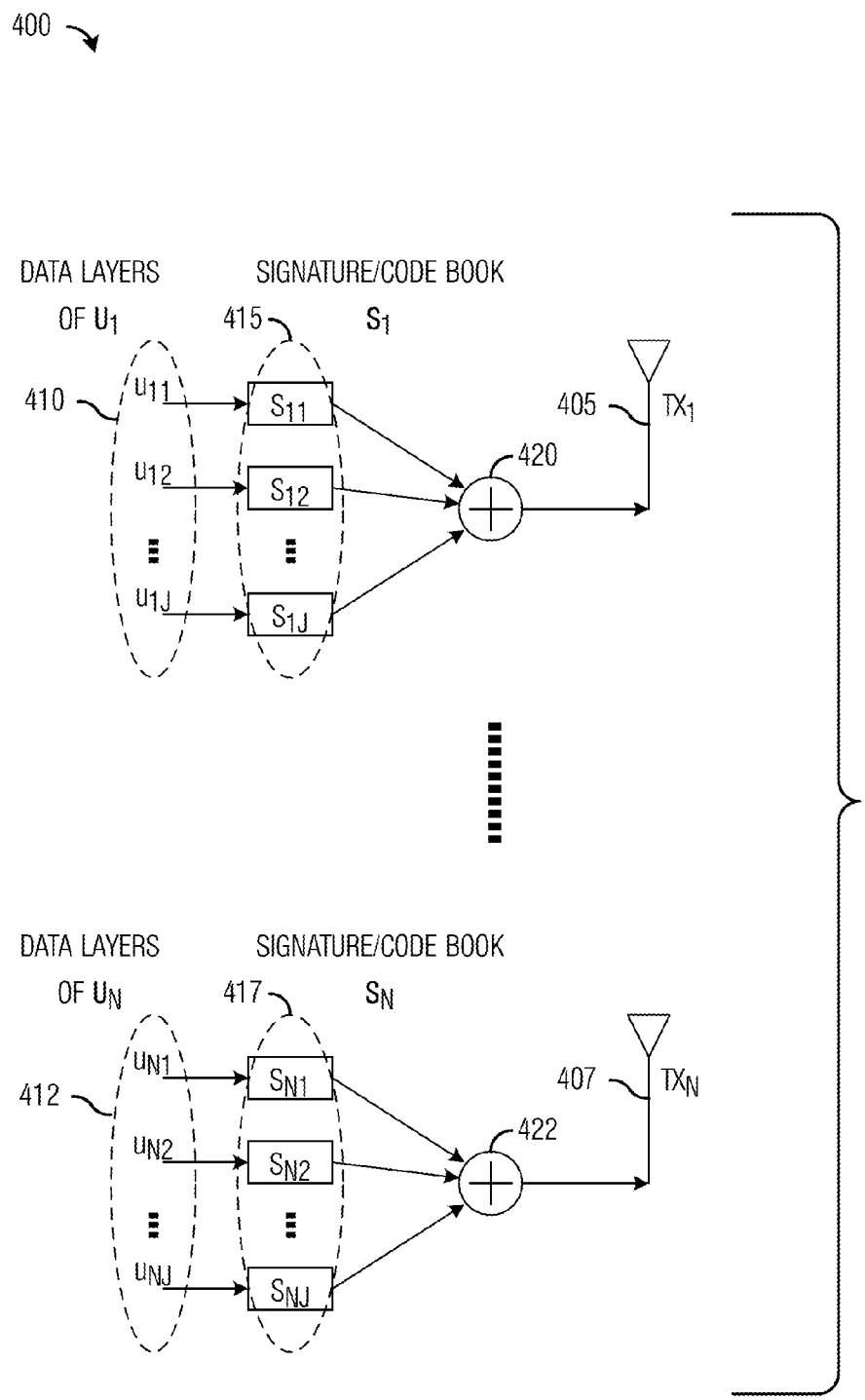
FIG. 4a illustrates an example portion of a transmitting device according to example embodiments described herein.

FIG. 4a illustrates a portion of a transmitting device 400. Transmitting device 400 supports open-loop MIMO code-space multiplexing for SCMA OFDM. As shown in FIG. 4, spreading occurs over the time and/or frequency domain. Transmitting device 400 supports the transmission of data to up to N*J users, denoted $U_1 \ldots U_{N,J}$, where N and J are an integer number greater than or equal to 1. It is noted that a single device may comprise one or more users; therefore, transmitting device 400 may support transmissions to up to N*J unique devices. Transmission device 400 also includes N transmit antenna, denoted $TX_1$ 405 ... $TX_N$ 407.

Data for a single user is mapped (or encoded) using a signature and/or codebook set. As an example, data transmitted from antenna 1 (denoted $U_1$ 410) includes up to J data layers, denoted $U_{11} \ldots U_{1,J}$, is mapped (or encoded) using a signature and/or codebook set $S_1$ 415. Signature and/or codebook set $S_1$ 415 includes J sub-signatures and/or sub-codebooks, denoted $S_{11} \ldots S_{1,J}$, with a sub-signature and/or sub-codebook assigned to one of the J data layers, where J is an integer number greater than or equal to 1. As shown in FIG. 4a, sub-signature and/or sub-codebook $S_{11}$ is assigned to data layer $U_{11}$, sub-signature and/or sub-codebook $S_{1,J}$ is assigned to data layer $U_{1,J}$. As another example, data transmitted from antenna N (denoted $U_N$ 412) includes up to J data layers, denoted $U_{N1} \ldots U_{N,J}$, is mapped (or encoded) using a signature and/or codebook set $S_N$ 417. Signature and/or codebook set $S_N$ 417 includes J sub-signatures and/or sub-codebooks, denoted $S_{N1} \ldots S_{N,J}$. As an illustrative example, a value of a number of bits of data layer $U_{11}$ may be used to index into sub-signature and/or sub-codebook $S_{11}$ (which is associated with data layer $U_{11}$) and a codeword corresponding to the value of the number of bits of data layer $U_{11}$ is a mapped (or encoded) representation of the value of the number of bits of data layer $U_{11}$. It is noted that the data as well as signature and/or codebook sets may be completely disjoint, completely the same, or have partial overlap. Overlap between the data determines a tradeoff between diversity and spectral efficiency resulting from multiplexing, while overlap in between the signature and/or codebook sets determines codebook utilization (or codebook utilization factor) in the communications system.

The mapped (or encoded) data may be combined prior to transmission by a respective transmit antenna. The mapped (or encoded) data may be in the form of a bit stream or a data stream. As an example, the mapped (or encoded) data to be transmitted from antenna 1 may be combined by combiner 420, which may combine the mapped (or encoded) data together to produce multiplexed codewords that are transmitted by transmit antenna $TX_1$ 405. As another example, if the data comprises only a single layer, a mapper may be used to map the mapped (or encoded) data onto output codewords that are subsequently transmitted. A combiner 422 combines, e.g., combines or maps, the corresponding mapped (or encoded) data prior to transmission by transmit antenna $TX_N$ 407.

Figure 4B:
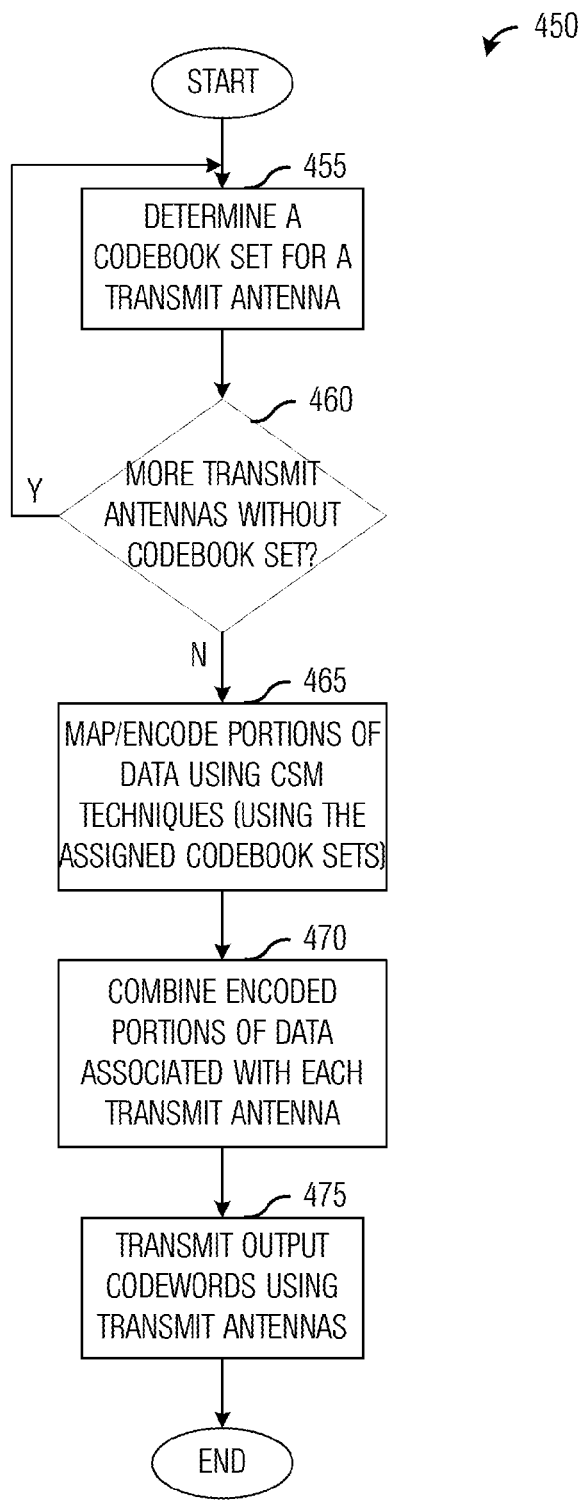
FIG. 4b illustrates an example flow diagram of high-level operations occurring in a transmitting device as the transmitting device transmits using open-loop MIMO code-space multiplexing for SCMA OFDM according to example embodiments described herein.

FIG. 4b illustrates a flow diagram of high-level operations 450 occurring in a transmitting device as the transmitting device transmits using open-loop MIMO code-space multiplexing for SCMA OFDM. Operations 450 may be indicative of operations occurring in a transmitting device, such as transmitting device 205, as the transmitting device transmits using open-loop MIMO code-space multiplexing.

Operations 450 may begin with the transmitting device determining a codebook set $S_Q$ for a transmit antenna Q of the transmitting device (block 455). The codebook set $S_Q$ may include J sub-codebooks (denoted $S_{Q1} \ldots S_{QJ}$) with a sub-codebook for each data layer transmitted by the transmit antenna, where Q and J are integer values and J is the number of data layers transmitted per transmit antenna. Typically, the codebook set $S_Q$ may be specified by a technical standard, selected by an operator of a communications system including the transmitting device, or a combination thereof. As an example, the technical standard may specify a plurality of codebook sets and the operator of the communications system may select a codebook set for the transmit antennas of the transmitting device out of the plurality of codebook sets. Each transmit antenna may be assigned a different codebook set, all of the transmit antennas may be assigned a single codebook set, or some transmit antennas may be assigned a single codebook set while others may be assigned different codebook sets. The codebook set and/or the plurality of codebook sets may be stored in a memory or a server and may be provided to the transmitting device or retrieved by the transmitting device at association and/or periodically signaled or indicated to the transmitting device. The transmitting device may perform a check to determine if there are more transmit antennas without codebook sets (block 460). If there is one or more transmit antennas without codebook sets, the transmitting device may return to block 465 to assign a codebook set to another transmit antenna.

The transmitting device may map (or encode) data for each of the transmit antennas a code space multiplexing (CSM) technique (block 465). CSM may involve the use of the codebook set(s) assigned to the transmit antennas to map (or encode) the data to be transmitted on each of the transmit antennas. Generally, data for each transmit antenna may be in the form of a bit stream and may include data for each of J data layers. The data for the transmit antenna may be partitioned into the J respective data layers and then the data for the each of the J data layers may be subpartitioned into transmission unit sized parts. As an illustrative example, if the transmission units are two-bits in size, the data for each of the J data layers may be subpartitioned into two-bit parts. A value of each of the transmission unit sized parts may be used to select a codeword (e.g., a spreading sequence) in a sub-codebook associated with the transmit antenna. The sub-codebook comprises a plurality of codewords (e.g., spreading sequences). The sub-codebooks are part of a set of codebooks. The selection of the codeword in the sub-codebook using the value of each of the transmission unit sized parts may be referred to as mapping (or encoding). As an example, if the value of a particular two-bit transmission unit size part for a data layer is "00", a codeword in the sub-cookbook associated with the data layer that corresponds to value "00" is selected as mapped (or encoded) data for the particular two-bit transmission unit size. It is noted that in a single data layer case (i.e., J=1), there is a single sub-codebook in the set of codebooks.

The transmitting device may combine the encoded data for the various data layers of a transmit antenna to produce output codewords (block 470). As discussed previously, the transmitting device may combine the encoded data by multiplexing the encoded data together, producing the output codewords, which may be in the form of a bit stream or a data stream. The transmitting device may transmit the output codewords on the respective transmit antennas (block 475). As an example, the transmit device may transmit an output codeword associated with a particular transmit antenna using the transmit antenna, such as output codeword Q for transmit antenna Q.

Figure 5A:
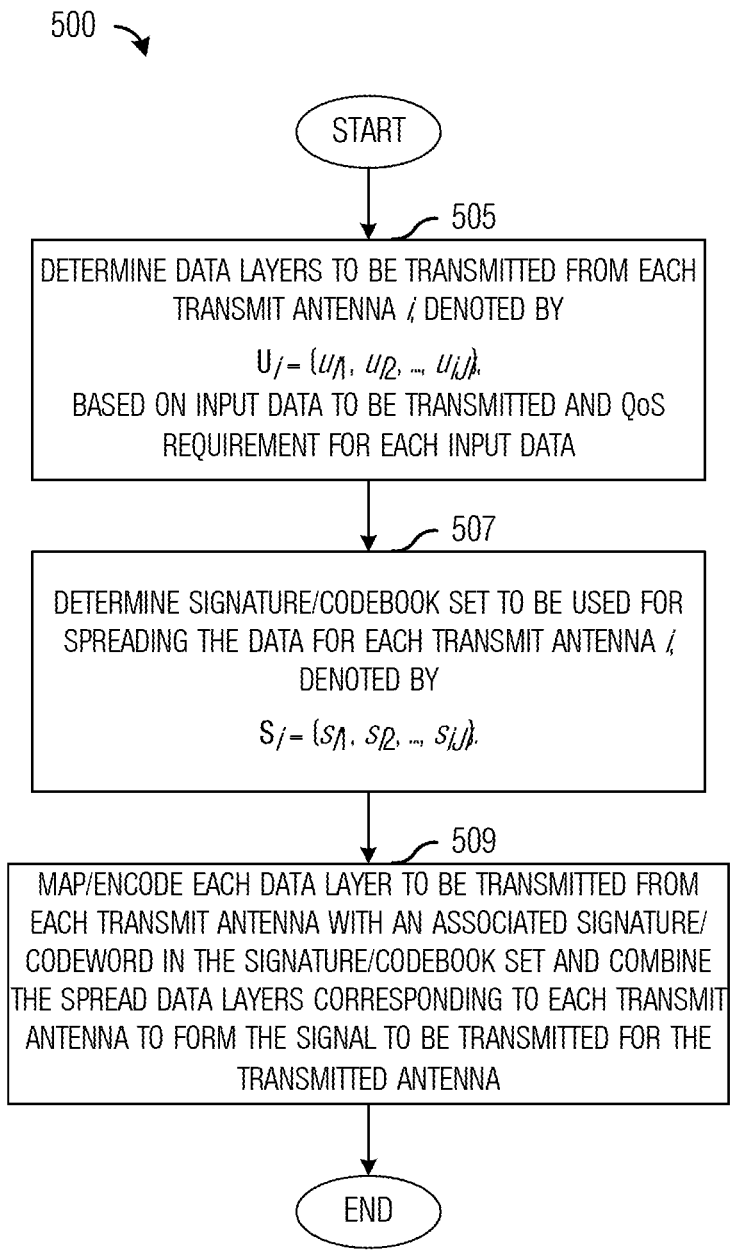
FIG. 5a illustrates an example flow diagram of operations occurring in a transmitting device as the transmitting device transmits to a receiving device using open-loop MIMO code-space multiplexing for SCMA OFDM according to example embodiments described herein.

FIG. 5a illustrates a flow diagram of operations 500 occurring in a transmitting device as the transmitting device transmits to a receiving device using open-loop MIMO code-space multiplexing for SCMA OFDM. Operations 500 may be indicative of operations occurring in a transmitting device, e.g., an eNB making a downlink transmission or a UE making an uplink transmission, as it transmits to a receiving device.

Operations 500 may begin with the transmitting device determining data or data layers to be transmitted by transmit antenna i, denoted $U_i$ (block 505). The determination of the data or data layers to be transmitted by transmit antenna i may be made in accordance with input data that is to be transmitted, as well as performance requirements for the input data, such as quality of service (QoS) requirements, receiving device priority, network condition, priority of other receiving devices served by the transmitting device, input data availability, and the like. The transmitting device may also determine a signature and/or codebook set to be used for spread the data or data layers for each transmit antenna i (block 507). The signature and/or codebook set, denoted $S_i$, may be determined in accordance with a codebook utilization factor. As an example, if the codebook utilization factor is to be high, then an overlap in the signature and/or codebook set $S_i$ and other signature and/or codebook sets used in the communication system is significant. While, if the codebook utilization factor is to be low, then the overlap in the signature and/or codebook set $S_i$ and other signature and/or codebook sets used in the communication system is insignificant or zero.

The transmitting device may encode the data or data layers to be transmitted by each transmit antenna with its associated signature and/or codebook set and combine the encoded data for each transmit antenna to form a signal to be transmitted by the transmit antenna (block 509). As discussed previously, each data layer to be transmitted by a transmit antenna may be encoded using a sub-signature and/or sub-codebook from the signature and/or codebook set associated with the transmit antenna. The encoded data may be combined, e.g., multiplexed or mapped, to form output codewords that are transmitted by the transmit antenna. As an example, the data layers of the input data to be transmitted by transmit antenna i may be encoded using signature and/or codebook $S_i$ and then combined by a combiner associated with transmit antenna i prior to being transmitted by transmit antenna i.

Figure 5B:
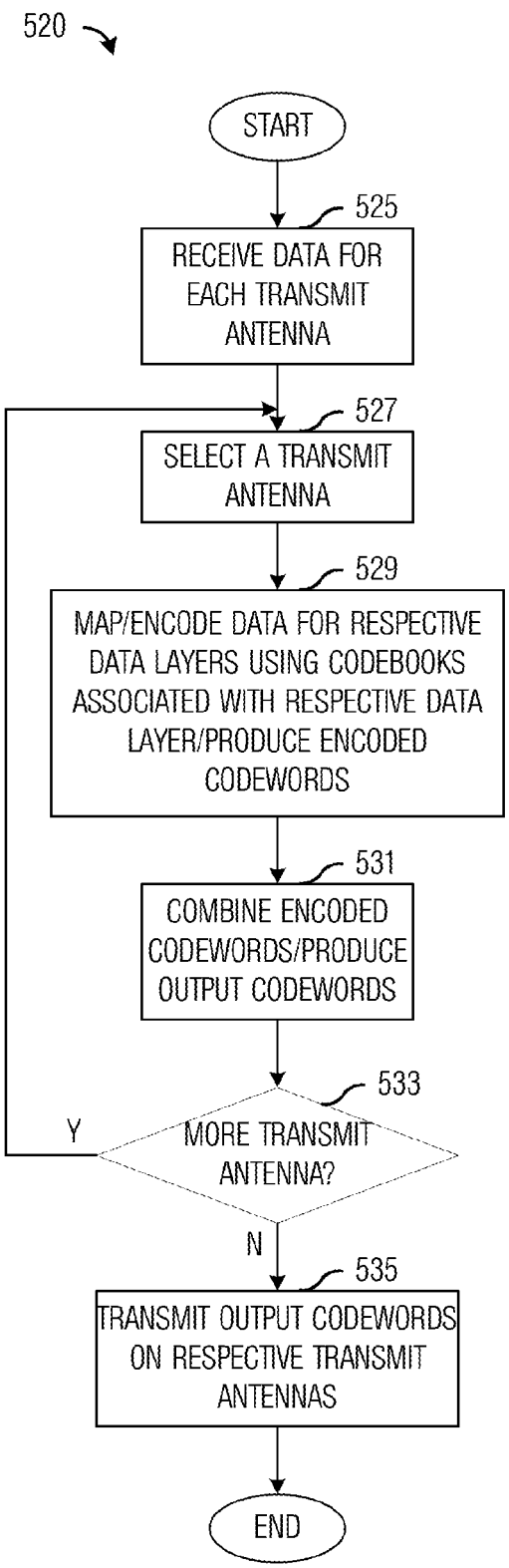
FIG. 5b illustrates an example flow diagram of operations occurring in a transmitting device as the transmitting device prepares multiple layers of data to be transmitted using open-loop MIMO code-space multiplexing for SCMA OFDM according to example embodiments described herein.

FIG. 5b illustrates a flow diagram of operations 520 occurring in a transmitting device as the transmitting device prepares multiple layers of data to be transmitted using open-loop MIMO code-space multiplexing for SCMA OFDM. Operations 520 may be indicative of operations occurring in a transmitting device, e.g., an eNB making a downlink transmission or a UE making an uplink transmission, as it prepares data to be transmitted to a receiving device. Operations 520 may be an example embodiment of block 509 of FIG. 5a.

Operations 520 may begin with the transmitting device receiving data for each transmit antenna (block 525). In general, the data for transmit antenna i is denoted $U_i$ and may include multiple data layers. The transmitting device may select one of its N transmit antennas (block 527) and map (or encode) data for the respective data layers using a signature and/or codebook set associated with the selected transmit antenna, producing encoded codewords (block 529). As an example, data for a data layer may have a value and the value may be used to index into a sub-signature and/or sub-codebook for the data layer to select a signature and/or codeword associated with the value. The selected signature and/or codeword may be used as an encoded codeword for the data layer. The transmitting device may combine (e.g., multiplex) the encoded codewords to produce an output codeword (block 531).

The transmitting device may perform a check to determine if there more transmit antennas that have not had their data encoded (block 533). If there are more transmit antennas, the transmitting device may return to block 527 to select another transmit antenna. If there are no more transmit antennas, the transmitting device may transmit the output codewords on respective transmit antennas (block 535).

Figure 5C:
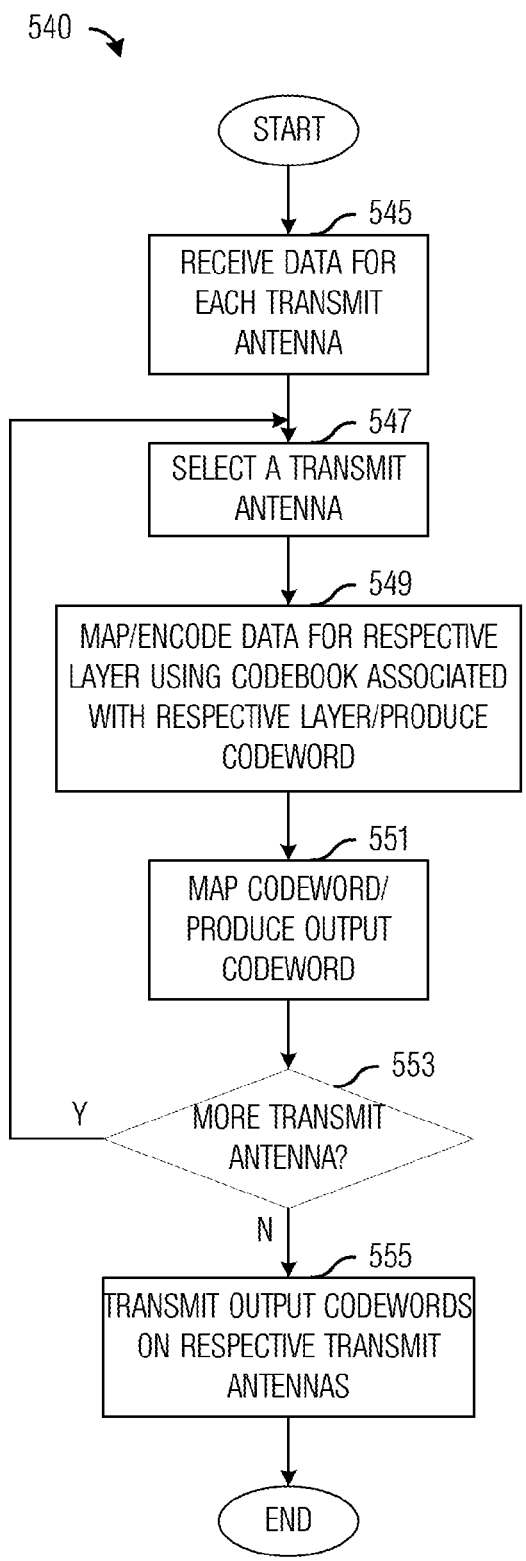
FIG. 5c illustrates an example flow diagram of operations occurring in a transmitting device as the transmitting device prepares a layer of data to be transmitted using open-loop MIMO code-space multiplexing for SCMA OFDM according to example embodiments described herein.

FIG. 5c illustrates a flow diagram of operations 540 occurring in a transmitting device as the transmitting device prepares a layer of data to be transmitted using open-loop MIMO code-space multiplexing for SCMA OFDM. Operations 540 may be indicative of operations occurring in a transmitting device, e.g., an eNB making a downlink transmission or a UE making an uplink transmission, as it prepares data to be transmitted to a receiving device. Operations 540 may be an example embodiment of block 509 of FIG. 5a.

Operations 540 may begin with the transmitting device receiving data for each transmit antenna (block 545). In general, the data for transmit antenna i is denoted $U_i$ and may include a single data layer. The transmitting device may select one of its N transmit antennas (block 547) and map (or encode) data for the data layer using a signature and/or codebook set associated with the selected transmit antenna, producing encoded codewords (block 549). As an example, data for the data layer may have a value and the value may be used to index into a sub-signature and/or sub-codebook for the data layer to select a signature and/or codeword associated with the value. The selected signature and/or codeword may be used as an encoded codeword for the data layer. The transmitting device may map the encoded codeword using a mapping rule associated with the transmit antenna to produce an output codeword (block 551).

The transmitting device may perform a check to determine if there more transmit antennas that have not had their data encoded (block 553). If there are more transmit antennas, the transmitting device may return to block 547 to select another transmit antenna. If there are no more transmit antennas, the transmitting device may transmit the output codewords on respective transmit antennas (block 555).

Figure 6A:
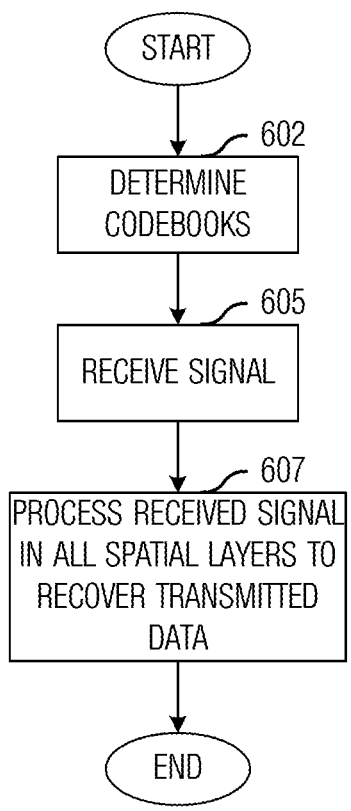
FIG. 6a illustrates an example flow diagram of operations occurring in a receiving device as the receiving device receives a transmission from a transmitting device where the transmission is transmitted using open-loop MIMO code-space multiplexing for SCMA OFDM according to example embodiments described herein.

FIG. 6a illustrates a flow diagram of operations 600 occurring in a receiving device as the receiving device receives a transmission from a transmitting device where the transmission is transmitted using open-loop MIMO code-space multiplexing for SCMA OFDM. Operations 600 may be indicative of operations occurring in a receiving device, e.g., a UE receiving a downlink transmission from an eNB or an eNB receiving an uplink transmission from a UE, as the receiving device receives a transmission from a transmitting device. Operations 600 may provide a high-level view of receiving a transmission when the transmission is made using open-loop MIMO code-space multiplexing for SCMA OFDM.

Operations 600 may begin with the receiving device determining one or more plurality of codebooks (block 602). As an example, the receiving device may determine the one or more plurality of codebooks in accordance with identifying information of a transmitting device(s) that is transmitting to the receiving device. The identifying information may include an identifier (ID) or identifiers (IDs) of the transmitting device(s), cell ID, cell IDs, and the like. The receiving device may use the identifying information to determine the one or more plurality of codebooks. As an illustrative example, the receiving device may have obtained codebook assignments from its serving eNB during an initial association or retrieved the codebook assignments during power up. The receiving device may utilize the codebook assignment and the identifying information to determine the one or more plurality of codebooks used to encode the transmissions from the transmitting device(s).

The receiving device may receive a signal transmitted by the transmitting device (block 605). The signal may include output codewords and may be communicated over shared resources of the communications system. The receiving device may process the received signal in all spatial layers to recover data transmitted in the signal (block 607). In general, the receiving device may feature multiple receive antenna to take full advantage of open-loop MIMO code-space multiplexing for SCMA OFDM. Hence, the processing performed by the receiving device to recover the transmitted data may be more complex than processing typically involved in recovering transmitted data when the receiving device has a single antenna or when multiple spatial layers are not used.

According to an example embodiment, the processing performed by the receiving device may differ depending on the complexity and/or capability of the receiving device. As an example, a low complexity and/or low capability processing technique may be utilized in a relatively inexpensive UE, while a high complexity and/or high capability processing technique may be used in a high-end UE or an eNB. Furthermore, a compromise midline complexity and/or midline capability processing technique may be used. In general, the use of a high complexity and/or high capability processing technique may result in better performance, while a low complexity and/or low capability processing technique may yield lower performance. Therefore, a trade-off may be made between performance and complexity.

Figure 6B:
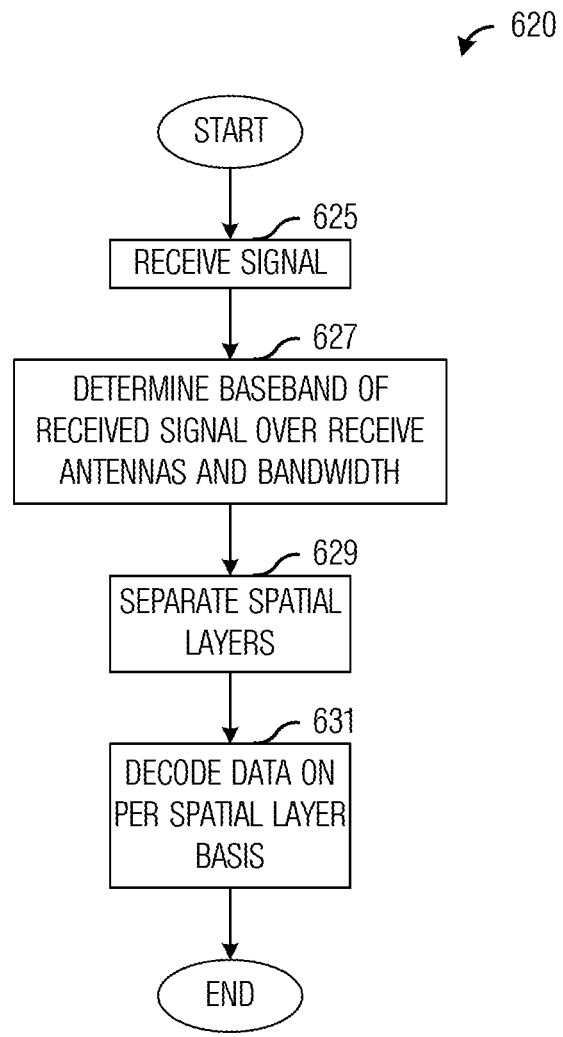
FIG. 6b illustrates an example flow diagram of operations occurring in a receiving device with low receiver complexity as the receiving device receives a transmission from a transmitting device where the transmission is transmitted using open-loop MIMO code-space multiplexing for SCMA OFDM according to example embodiments described herein.

FIG. 6b illustrates a flow diagram of operations 620 occurring in a receiving device with low receiver complexity as the receiving device receives a transmission from a transmitting device where the transmission is transmitted using open-loop MIMO code-space multiplexing for SCMA OFDM. Operations 620 may be indicative of operations occurring in a receiving device, e.g., a UE receiving a downlink transmission from an eNB or an eNB receiving an uplink transmission from a UE, as the receiving device receives a transmission from a transmitting device. Operations 620 may be a detailed implementation of operations 600 of FIG. 6a.

Operations 620 may begin with the receiving device receiving a signal transmitted by the transmitting device (block 625). The receiving device may determine a baseband signal of the received signal over the receive antennas of the receiving device and the bandwidth for the received signal (block 627). The baseband signal may be a version of the received signal that has been down converted from a carrier frequency. With low receiver complexity, the receiving device may not be capable of performing complicated processing on the baseband signal while maintaining desired performance. Therefore, the processing of the baseband signal may take place in distinct stages.

Figure 7A:
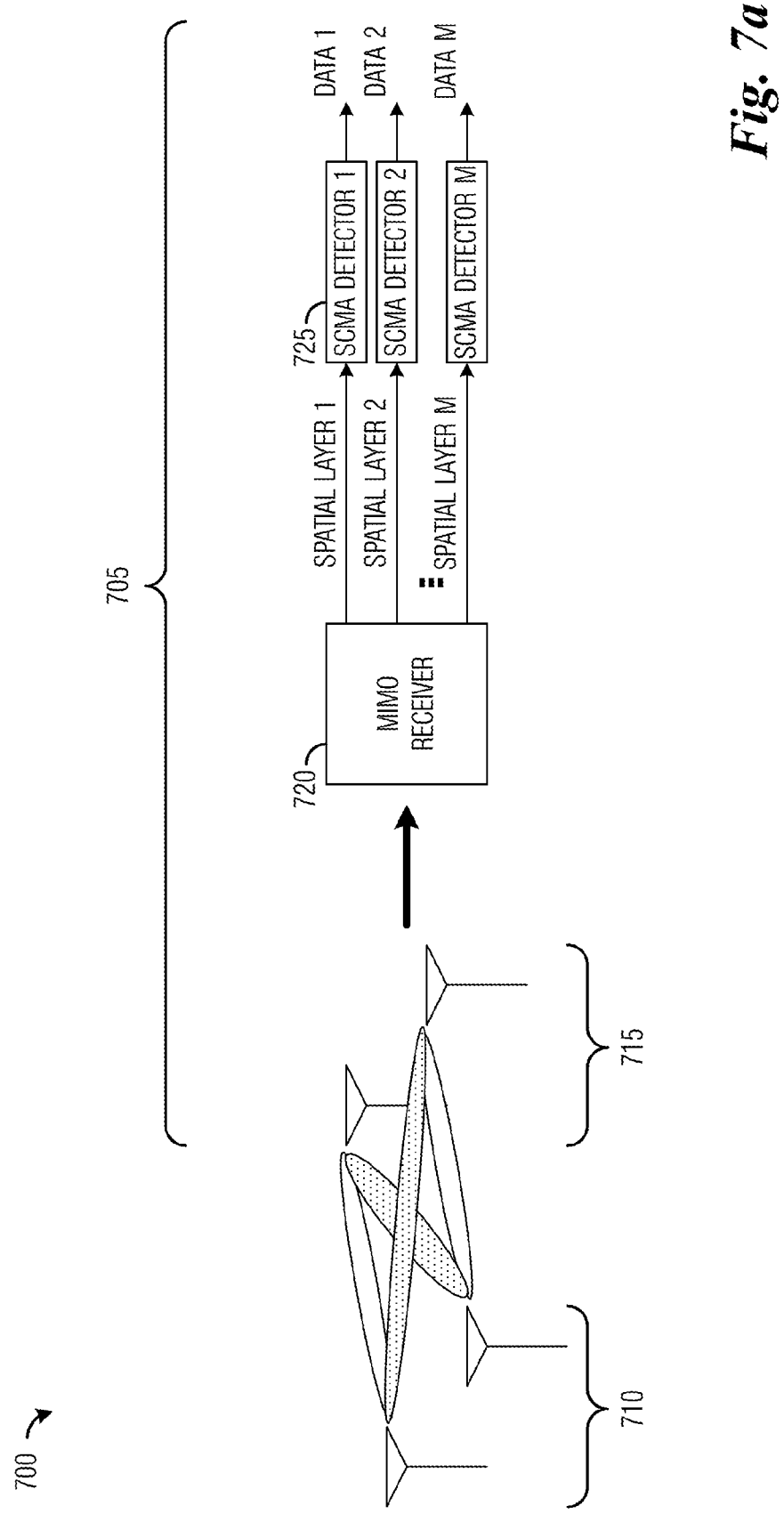
FIG. 7a illustrates an example portion of a communications system with a receiving device with low receiver complexity according to example embodiments described herein.

The receiving device may separate the different data layers of the baseband signal in the spatial domain (block 629). In other words, the receiving device may separate the baseband signal into a plurality of different sub-signals, with one sub-signal per spatial layer. The receiving device may use a MIMO receiver, e.g., a minimum mean square error (MMSE) receiver, to separate the different data layers of the baseband signal in the spatial domain. The receiving device may decode data in the baseband signal on a per spatial layer basis (block 631). The receiving device may use a SCMA detector to separately decode data on each spatial layer. It is noted that each spatial layer may be decoded using a separate SCMA detector. As an example, the SCMA detector may implement a MPA along with turbo decoding algorithm. FIG. 7a illustrates a portion of a communications system 700 with a receiving device 705 with low receiver complexity. Transmitting antennas 710 of a transmitting device transmits data, which are received by receiving antennas 715 of receiving device 705. A baseband signal of the received signal may be provided to a MIMO receiver 720 which separates the multiple data layers into M spatial layers, where M is an integer number greater than or equal to 1. Each of the M spatial layers may be provided to one of M SCMA detectors, such as SCMA detector 725. The M SCMA detectors decode their respective spatial layer to produce M data streams, which may be further processed by receiving device 705.

Figure 6C:
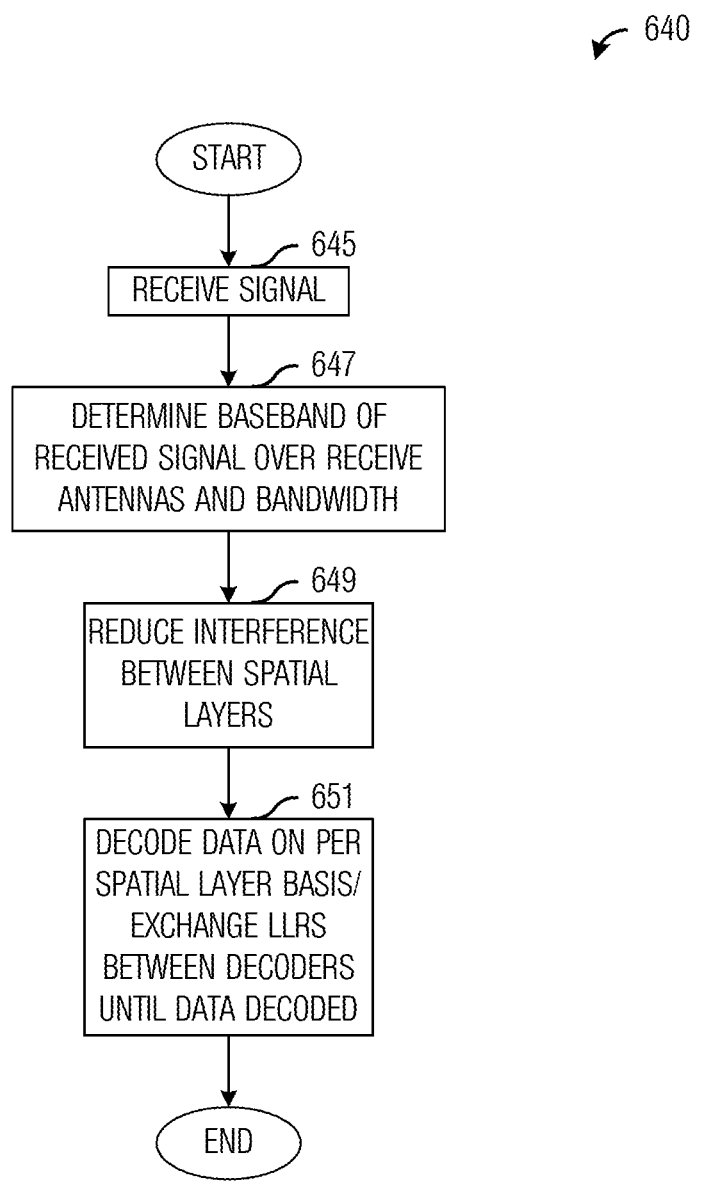
FIG. 6c illustrates an example flow diagram of operations occurring in a receiving device with medium receiver complexity as the receiving device receives a transmission from a transmitting device where the transmission is transmitted using open-loop MIMO code-space multiplexing for SCMA OFDM according to example embodiments described herein.

FIG. 6c illustrates a flow diagram of operations 640 occurring in a receiving device with medium receiver complexity as the receiving device receives a transmission from a transmitting device where the transmission is transmitted using open-loop MIMO code-space multiplexing for SCMA OFDM. Operations 640 may be indicative of operations occurring in a receiving device, e.g., a UE receiving a downlink transmission from an eNB or an eNB receiving an uplink transmission from a UE, as the receiving device receives a transmission from a transmitting device. Operations 640 may be a detailed implementation of operations 600 of FIG. 6a.

Operations 640 may begin with the receiving device receiving a signal transmitted by the transmitting device (block 645). The receiving device may determine a baseband signal of the received signal over the receive antennas of the receiving device and the bandwidth for the received signal (block 647). The receiving device may separate the different data layers in the baseband signal as well as partially cancel interference between spatial layers (block 649). The receiving device may use a MIMO receiver to perform the partial separation of the data layers and the partial cancellation of interference. As an illustrative example, a MIMO receiver may be selected so that noise enhancement due to the MIMO receiver is minimized. The receiving device may decode data in the baseband signal on a per spatial layer basis (block 651). The receiving device may exchange log likelihood ratios (LLRs) between decoders until the data is decoded. The receiving device may use a SCMA detector, e.g., a MPA detector, to separately decode data on each spatial layer. It is noted that as few as two SCMA detectors may be needed. Any remaining interference not removed by the MIMO receiver may be removed by cooperation between the SCMA detectors, such as MPA decoders.

According to an example embodiment where a receiving device has medium receiver complexity, the receiving device may implement MIMO receiver to perform QR decomposition on the spatial layers. As an example, in the case of a two by two MIMO system with two spatial layers, the baseband signal in the received signal may be expressed as: y=H x+n in which H represents the channel matrix, x is the transmitted SCMA signals and n is the noise. Using QR decomposition, H may be written as Q*R in which Q is a unitary matrix and R is an upper triangular matrix which may be expressed as $$\begin{bmatrix} R_{11} & R_{12} \\ 0 & R_{22} \end{bmatrix}.$$

The MIMO receiver may be represented as the transpose conjugate of Q. After the MIMO receiver, the second spatial layer does not see any interference from the first spatial layer and may be decoded using a SCMA detector, e.g., a MPA detector. After decoding, the LLRs corresponding to the second spatial layer may be considered while decoding the first spatial layer using a SCMA detector, e.g., a MPA detector. The procedure may be performed iteratively until all of data has been decoded.

Figure 7B:
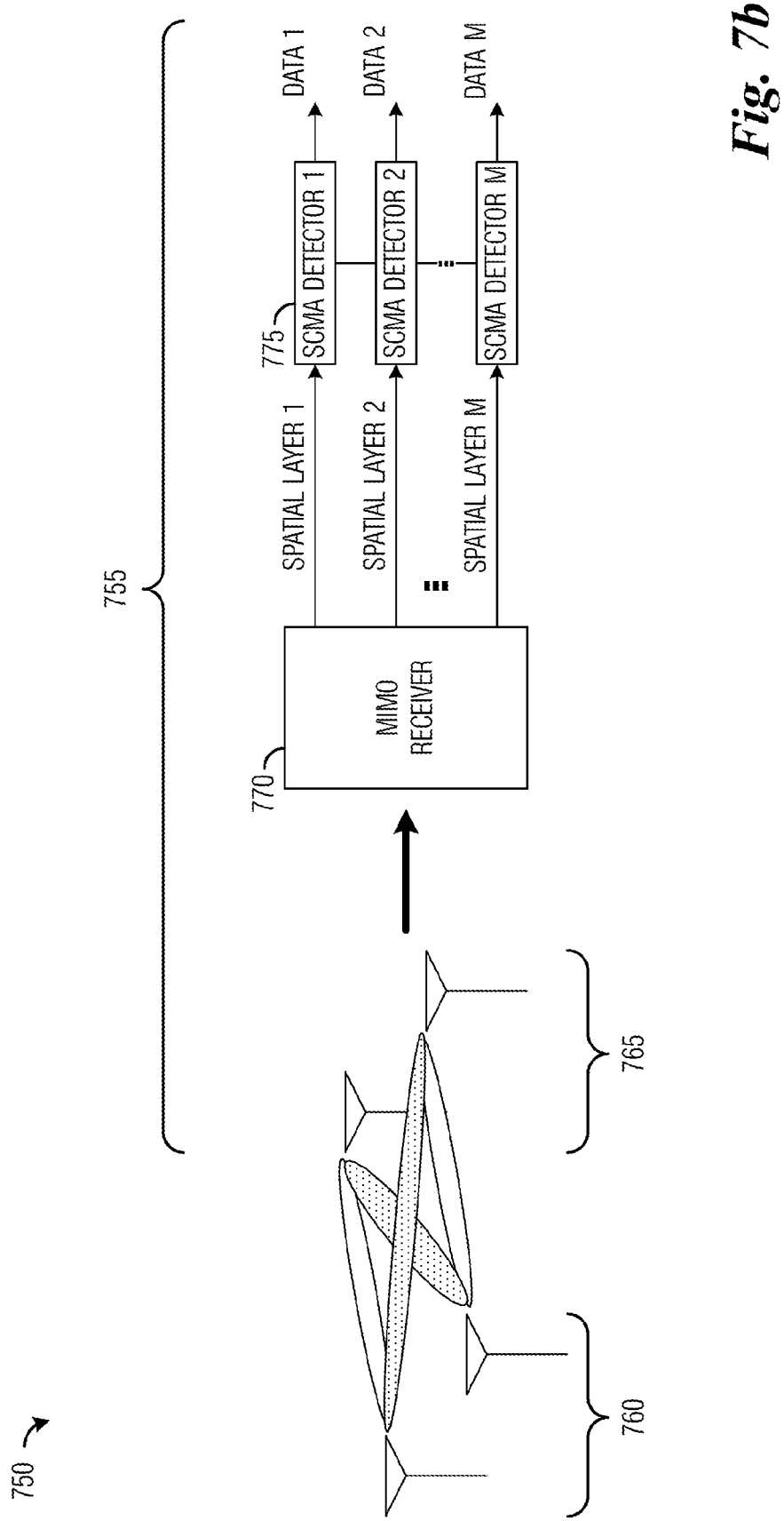
FIG. 7b illustrates an example portion of a communications system with a receiving device with medium receiver complexity according to example embodiments described herein.

FIG. 7b illustrates a portion of a communications system 750 with a receiving device 755 with medium receiver complexity. Transmitting antennas 760 of a transmitting device transmits data, which are received by receiving antennas 765 of receiving device 755. A baseband signal of the received signal may be provided to a MIMO receiver 770 which separates the multiple data layers into M spatial layers, where M is an integer number greater than or equal to 1. Each of the M spatial layers may be provided to one of M SCMA detectors, such as SCMA detector 775. The M SCMA detectors decode their respective spatial layer to produce M data streams, which may be further processed by receiving device 755. The M SCMA detectors may exchange LLRs until the data is decoded.

Figure 6D:
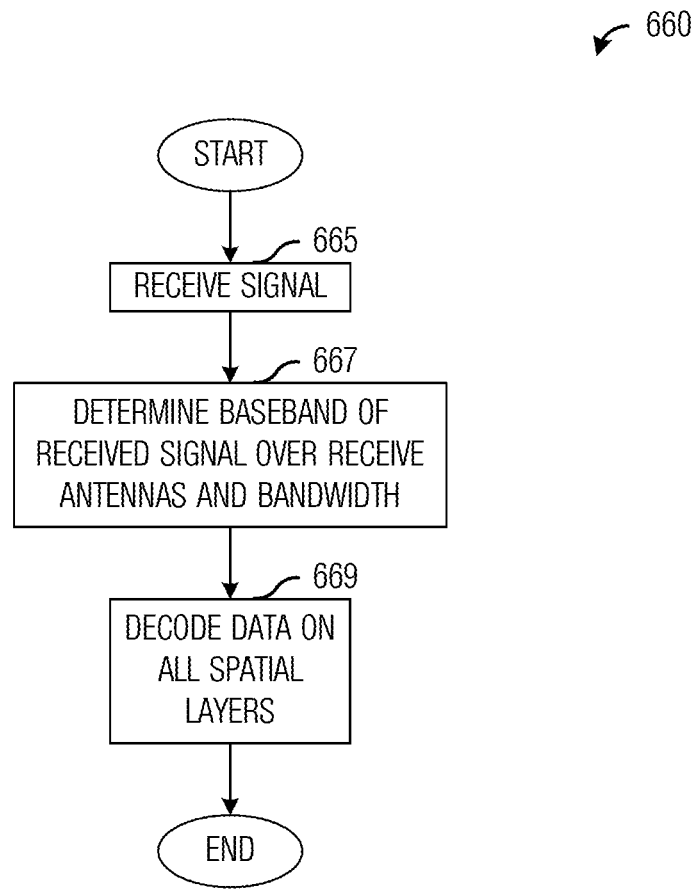
FIG. 6d illustrates an example flow diagram of operations occurring in a receiving device with high receiver complexity as the receiving device receives a transmission from a transmitting device where the transmission is transmitted using open-loop MIMO code-space multiplexing for SCMA OFDM according to example embodiments described herein.

FIG. 6d illustrates a flow diagram of operations 660 occurring in a receiving device with high receiver complexity as the receiving device receives a transmission from a transmitting device where the transmission is transmitted using open-loop MIMO code-space multiplexing for SCMA OFDM. Operations 660 may be indicative of operations occurring in a receiving device, e.g., a UE receiving a downlink transmission from an eNB or an eNB receiving an uplink transmission from a UE, as the receiving device receives a transmission from a transmitting device. Operations 660 may be a detailed implementation of operations 600 of FIG. 6a.

Figure 8:
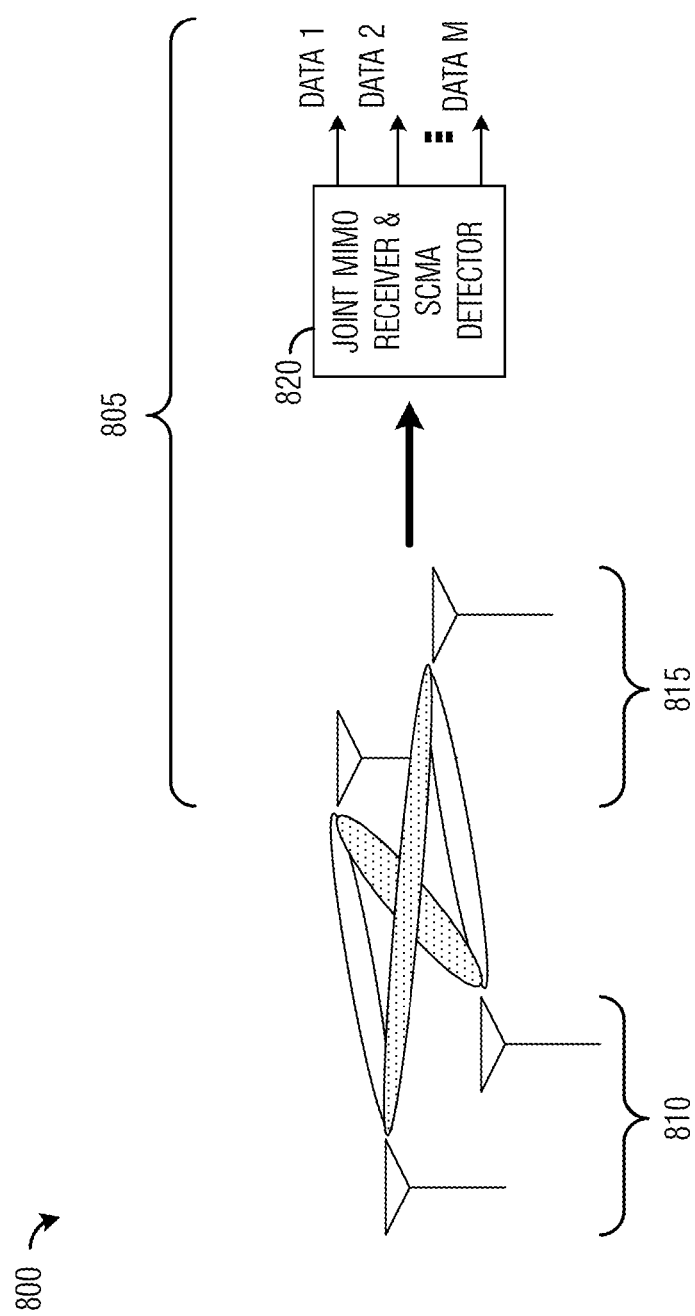
FIG. 8 illustrates an example portion of a communications system with a receiving device with high receiver complexity according to example embodiments described herein.

Operations 660 may begin with the receiving device receiving a signal transmitted by the transmitting device (block 665). The receiving device may determine a baseband signal of the received signal over the receive antennas of the receiving device and the bandwidth for the received signal (block 667). The receiving device may decode data on all spatial layers of the baseband signal (block 669). The receiving device may use a joint MIMO receiver, e.g., a maximal ratio combiner (MRC), and a SCMA decoder, e.g., a MPA decoder, for all spatial layers. The receiving device may have the same structure as a single spatial layer SCMA decoder where the number of SCMA layers is multiplied by the number of spatial layers. In situations where interference between the layers degrades performance, additional outer loop iterations and/or power offsets between spatial layers or transmit antennas may help improve performance. FIG. 8 illustrates a portion of a communications system 800 with a receiving device 805 with high receiver complexity. Transmitting antennas 810 of a transmitting device transmits data, which are received by receiving antennas 815 of receiving device 805. A baseband signal of the received signal may be provided to a joint MIMO receiver and SCMA detector 820 which decodes the baseband signal with all of its spatial layers to produce M data streams, which may be further processed by receiving device 805. As an example, joint MIMO receiver and SCMA detector 820 may implement a MRC receiver and a MPA decoder.

Figure 9:
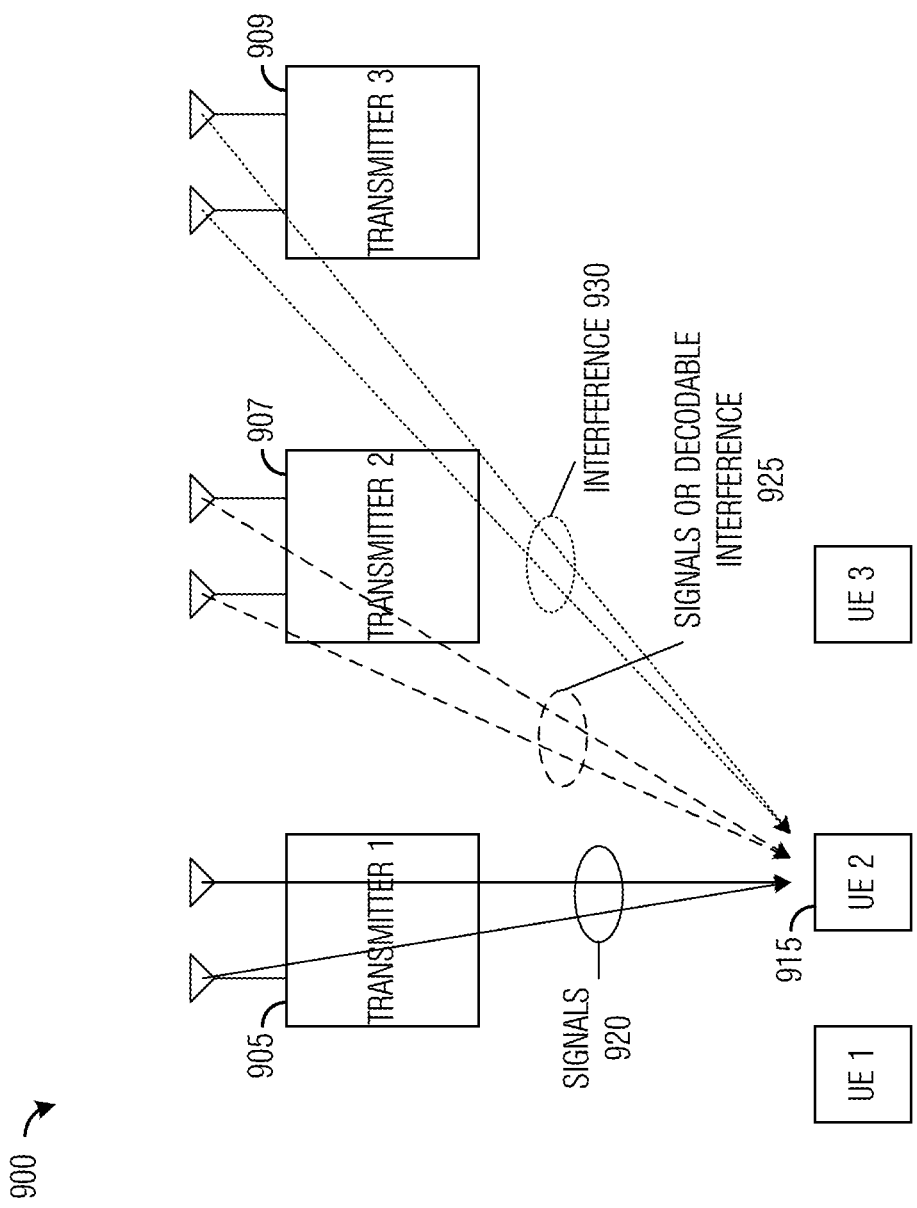
FIG. 9 illustrates an example portion of a communications system where interference management is performed using signature and/or codebook set assignment according to example embodiments described herein.

FIG. 9 illustrates a portion of a communications system 900 where interference management is performed using signature and/or codebook set assignment. As shown in FIG. 9, three transmitting devices, transmitter 905, transmitter 907, and transmitter 909, are shown actively making transmissions. In general, transmissions from transmitting devices that are relatively close to a receiving device, such as UE 915, may cause interference to the receiving device. A variety of techniques such as fractional frequency reuse, beam shaping, beamforming, and the like, have been proposed to help reduce or eliminate interference. For discussion purposes, consider a situation as shown in FIG. 9, where first transmissions from multiple transmit antennas of transmitter 905 arrive at UE 915 as signals 920, second transmissions from multiple transmit antennas of transmitter 907 arrive at UE 915 as signals (if joint transmission (JT) is used) or decodable interference 925, and third transmissions from multiple transmit antennas of transmitter 909 arrive at UE 915 as interference 930.

According to an example embodiment, it may be possible to perform multi-transmission point interference management through signature and/or codebook set assignment. As an example, it may be possible to assign different signature and/or codebook sets to different transmit antennas at each transmitting device. With such a configuration, each transmit antenna uses a different signature and/or codebook set to multiplex SCMA signals. It is noted that for uncorrelated antennas, it is possible to share the same signature and/or codebook set. Furthermore, different transmitting devices may use the same signature and/or codebook sets or different signature and/or codebook sets. In such a configuration, the receiving device may jointly detect signals from multiple transmitting devices and if a signal from a transmitting device is sufficiently weak, it may be automatically treated as interference. Additionally, transmitting devices may jointly transmit the same data over some CSM layers to improve diversity for receiving devices operating with poor signal conditions. Such transmitting devices may use joint transmission (JT) processing techniques with the same signature and/or codebook sets.

For discussion purposes, consider a situation as shown in FIG. 9, where first transmissions from multiple transmit antennas of transmitter 905 arrive at UE 915 as signals 920, second transmissions from multiple transmit antennas of transmitter 907 arrive at UE 915 as signals (if joint transmission (JT) is used) or decodable interference 925, and third transmissions from multiple transmit antennas of transmitter 909 arrive at UE 915 as interference 930. Transmitter 905 and transmitter 907 are using JT processing to transmit the same data to UE 915 with the same signature and/or codebook sets. Therefore, UE 915 may be able to use diversity to improve its relatively poor signal condition. Transmitter 909 is relatively far away from UE 915, so its signals arrive at UE 915 having low signal strength and UE 915 may consider transmissions from transmitter 909 as interference 930. Similarly, if transmissions from transmitter 907 arrive at UE 915 with low signal strength, UE 915 may consider those transmissions as interference.

The communications system, an entity in the communications system, an operator of the communications system, a technical standard, and the like, may generate or specify a mapping of signature and/or codebook sets to transmitting devices. The generation or specification of the mapping may be performed a priori and stored for subsequent use. Alternatively, the mapping may be performed dynamically during operations to meet changing operating conditions. The mapping may be provided to the receiving devices. As an example, UEs may be provided the mapping when they associate with an eNB of the communications system. As another example, after providing the initial mapping, subsequent mappings may be broadcast or multicast to the receiving devices as the mapping is adjusted or changed.

Generally, a receiving device, such as a UE receiving a downlink transmission or an eNB receiving an uplink transmission, may need to know potentially active signature and/or codebook sets from transmitting devices that will be transmitting to it, i.e., the transmitting devices that are in its cooperating set (e.g., a CoMP set). The receiving device may utilize centric transmitting device selection, which is similar to CRAN best transmit point selection. The receiving device may obtain information regarding the potentially active signature and/or codebook sets from its cooperation set configuration and the mapping of signature and/or codebook sets to transmitting devices provided to it when it associated with an eNB or through broadcasts or multicasts.

Figure 10A:
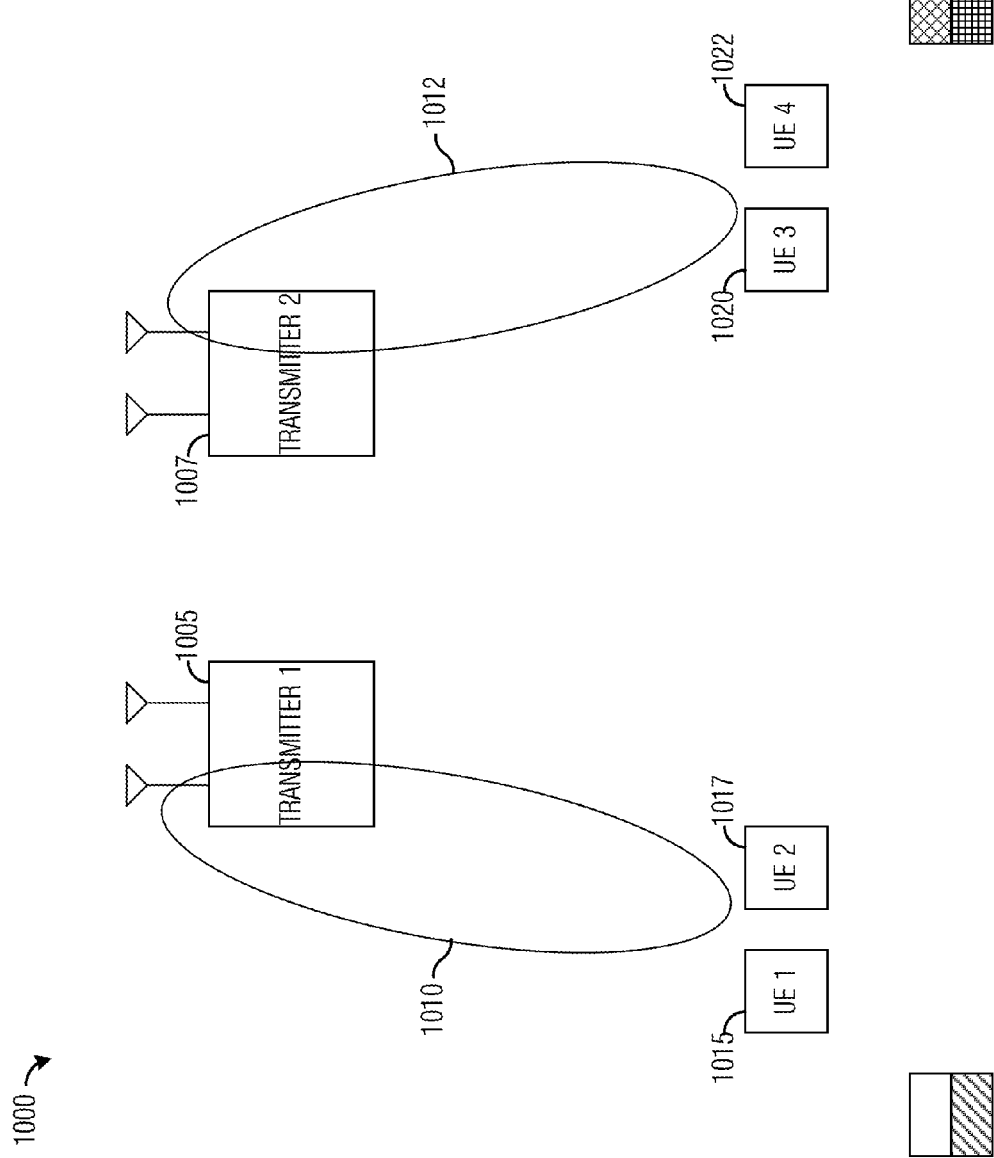
FIG. 10a illustrates an example communications system where inter-transmitter coordinated beamforming (CBF) is used with open-loop MIMO CSM according to example embodiments described herein.

FIG. 10*a* illustrates a communications system 1000 where inter-transmitter coordinated beamforming (CBF) is used with open-loop MIMO CSM. Communications system 1000 includes transmitting devices, such as transmitter 1005 and transmitter 1007, and receiving devices, such as UE 1015, UE 1017, UE 1020, and UE 1022. Uncoordinated transmissions may result in high levels of interference between neighboring transmitting devices. Generally, CBF involves the coordination of transmission beamforms used by multiple transmitting devices so that interference to neighboring transmitting devices is reduced or eliminated. Different transmitting devices, such as transmitter 1005 and transmitter 1007, may apply receiving device group based precoders to produce a transmission beamform, such as beamform 1010 or beamform 1012, to reduce interference to its neighboring transmitting devices. As shown, transmitter 1005 may select beamform 1010 to transmit to receiving devices, such as UE 1015 and UE 1017, so that it reduces interference to transmissions of transmitter 1007 to receiving devices, such as UE 1020 and UE 1022, using beamform 1012. It is noted that the precoders (and therefore, the resulting beamforms) may change over time and/or frequency to reduce or eliminate interference to other neighboring transmitting devices. Remaining interference may be cancelled at the receiving devices through the use of a SCMA decoder, such as a MPA decoder. The performance may be further improved through thoughtful signature and/or codebook set assignments.

Figure 10B:
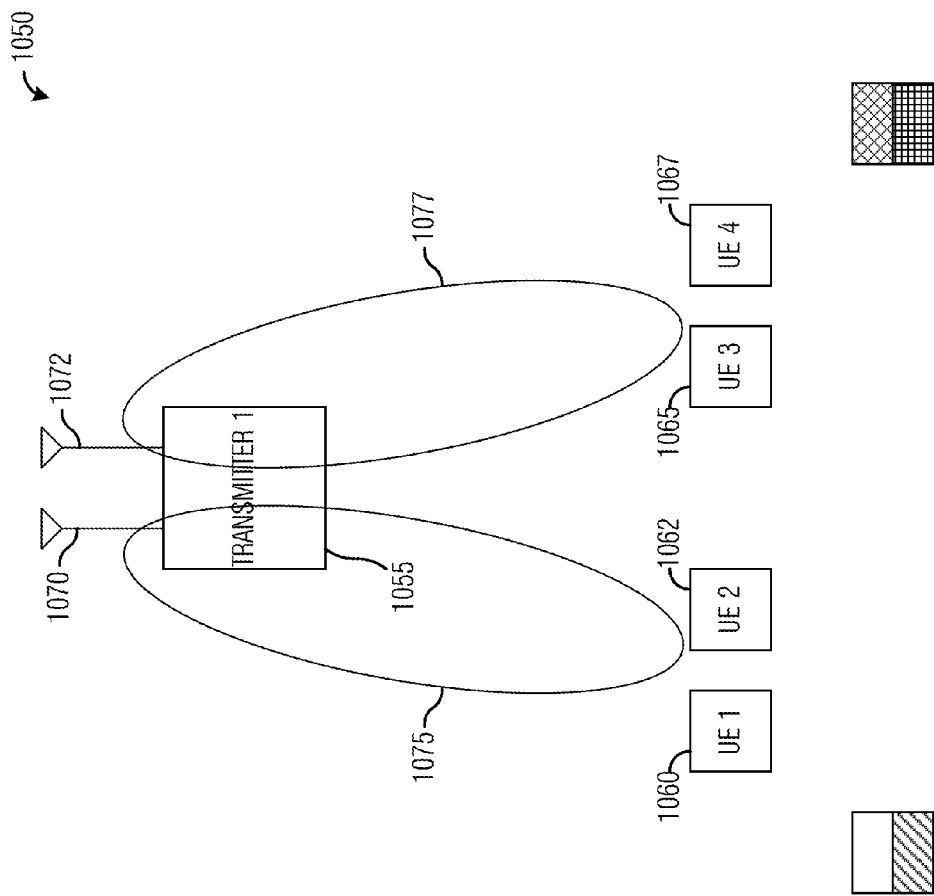
FIG. 10b illustrates an example communications system where intra-transmitter coordinated beamforming (CBF) is used with open-loop MIMO CSM according to example embodiments described herein.

FIG. 10*b* illustrates a communications system 1050 where intra-transmitter CBF is used with open-loop MIMO CSM. Communications system 1050 includes a transmitting device 1055 serving receiving devices, such as UE 1060, UE 1062, UE 1065, and UE 1067. As with inter-transmitter CBF, uncoordinated transmissions from the transmit antennas of a single transmitting device may cause interference with one another. Intra-transmitter CBF involves coordination of transmission beamforms used by the transmit antennas of a transmitting device to reduce or eliminate interference to other transmit antennas of the same transmitting device. Different transmit antennas, such as antenna 1070 and antenna 1072, may apply receiving device group based precoders to produce a transmission beamform, such as beamform 1075 and beamform 1077, to reduce interference to its other transmit antennas. As shown, transmit antenna 1070 may select beamform 1075 to its receiving devices, such as UE 1060 and UE 1062, so that it reduces interference to transmissions of transmit antenna 1072 to receiving devices, such as UE 1065 and UE 1067, using beamform 1077. The use of receiving device group based precoders enable co-transmission to multi-SCMA receiving devices. Remaining interference may be cancelled at the receiving devices through the use of a SCMA decoder, such as a MPA decoder. The performance may be further improved through thoughtful signature and/or codebook set assignments.

Figure 11A:
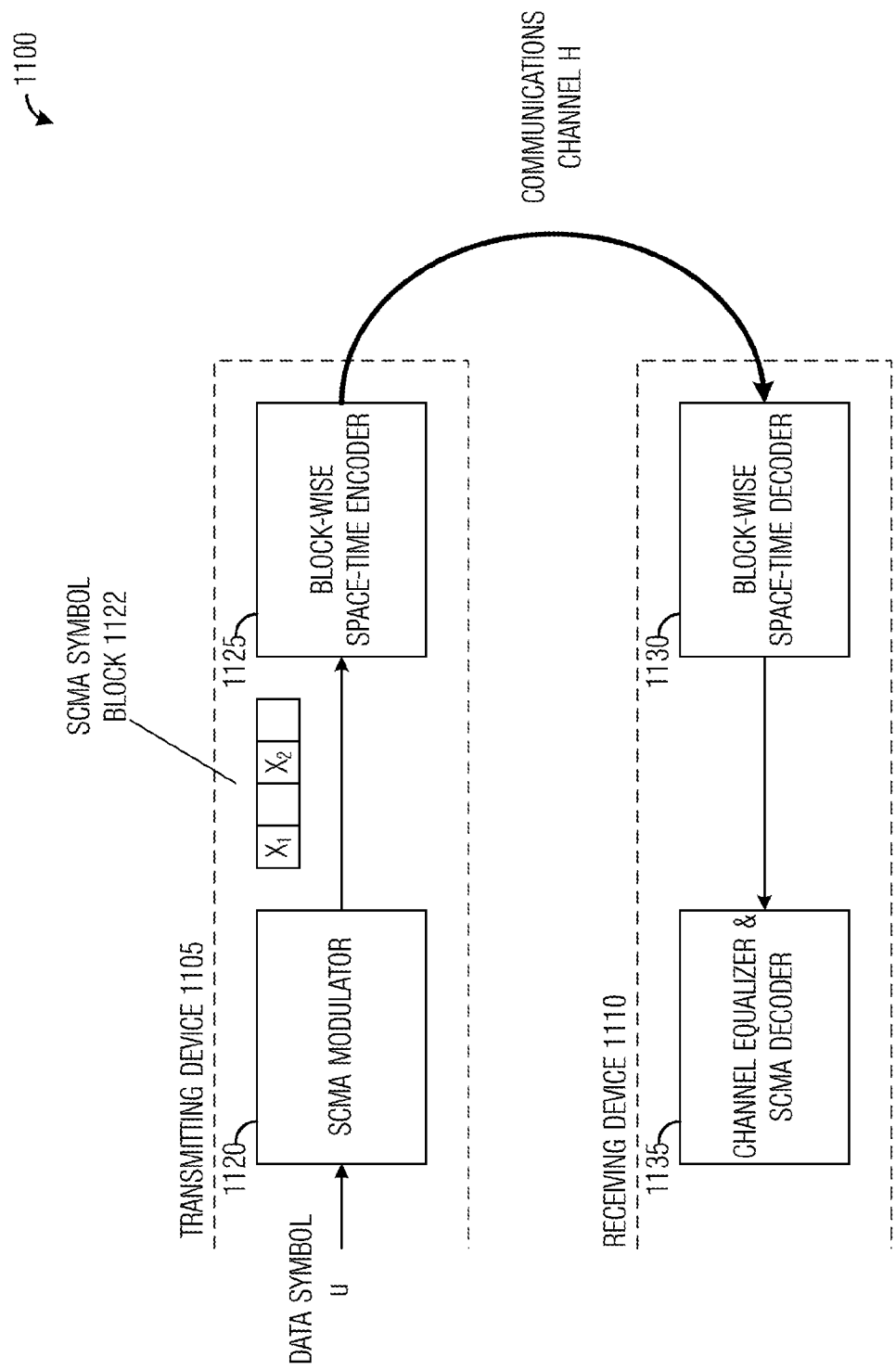
FIG. 11a illustrates an example model of a transmitting device-receiving device pair used in block-wise space-time coding in MIMO SCMA where the receiving device has low complexity according to example embodiments described herein.

FIG. 11*a* illustrates a model 1100 of a transmitting device-receiving device pair for implementation of block-wise space-time coding in MIMO SCMA where the receiving device has low complexity. Model 1100 includes a transmitting device 1105 and a receiving device 1110 coupled together by a communications channel, H. Transmitting device 1105 and receiving device 1110 include circuitry to support transmit diversity for MIMO SCMA OFDM through the use of block-wise space-time coding. In general, space-time coding employs the transmission, by a transmitting device, of multiple redundant copies of data over the communications channel H to help improve the reliability of data transmission. With the transmission of multiple copies of the data, it is thought that some of the copies will successfully arrive at a receiving device, thereby allowing the data to be recovered.

Transmitting device 1105 includes a SCMA modulator 1120 that encodes a data symbol u, producing a SCMA symbol block 1122. SCMA symbol block 1122 is shown as including four tones, two of which are non-zero. However, other configurations are possible. Other configurations include different number of tones, as well as different number (and location) of non-zero tones. SCMA symbol block 1122 is provided to a block-wise space-time encoder 1125 which typically encodes SCMA symbol block 1122 a block at a time. Block-wise space-time encoder 1125 may also provide a coding gain in addition to the diversity gain. Block-wise space-time encoder 1125 may be able to utilize available space-time codes, with spreading being performed in multi-carrier time and/or frequency domains. It is also possible to achieve double domain diversity in both time and/or frequency and space domains. Transmitting device 1105 transmits the data symbol u as encoded by block-wise space-time encoder 1125.

Receiving device 1110 includes a block-wise space-time decoder 1130 decodes a received version of the encoded data symbol u. Block-wise space-time decoder 1130 may be able to decode a the received version of the encoded data symbol u, from a version of BWST symbol (or a block of multiplexed BWST symbols) transmitted by transmitting device 1105. Block-wise space-time decoder 1130 may be able to exploit the transmit diversity inherent in the space-time coding to recover from errors and/or interference present in the communications channel H to produce one or more SCMA symbol blocks from the BWST symbol or block of multiplexed BWST symbols. A channel equalizer and SCMA decoder 1135 recovers the data symbol u from the one or more SCMA symbol blocks.

Figure 11B:
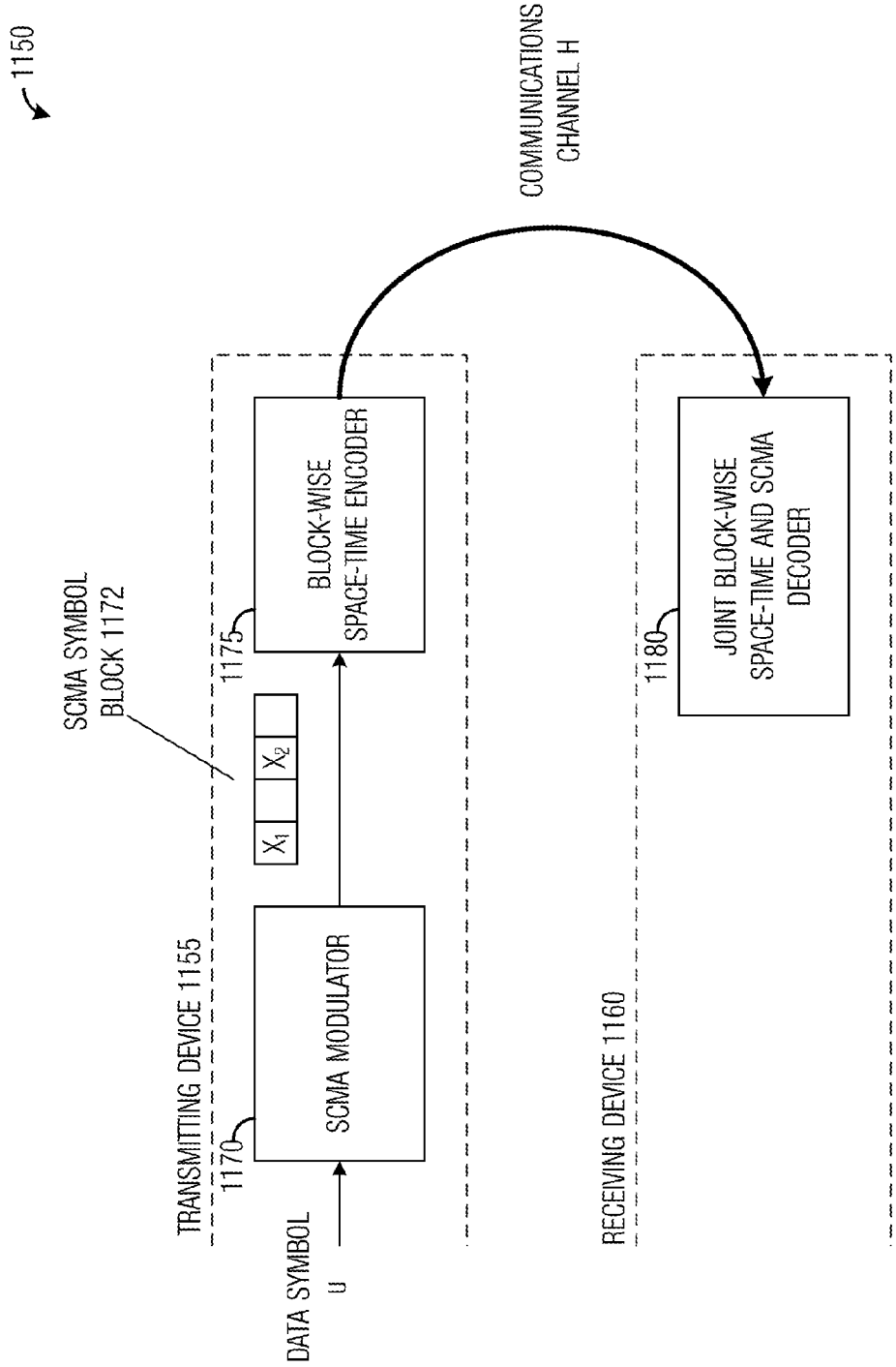
FIG. 11b illustrates an example model of a transmitting device-receiving device pair used in block-wise space-time coding in MIMO SCMA where the receiving device has high complexity according to example embodiments described herein

FIG. 11*b* illustrates a model 1150 of a transmitting device-receiving device pair for implementation of block-wise space-time coding in MIMO SCMA where the receiving device has high complexity. Model 1150 includes a transmitting device 1155 and a receiving device 1160 coupled together by a communications channel, H. Transmitting device 1155 and receiving device 1160 include circuitry to support transmit diversity for MIMO SCMA OFDM through the use of block-wise space-time coding. In general, space-time coding employs the transmission, by a transmitting device, of multiple redundant copies of data over the communications channel H to help improve the reliability of data transmission. With the transmission of multiple copies of the data, it is thought that some of the copies will successfully arrive at a receiving device, thereby allowing the data to be recovered.

Transmitting device 1155 includes a SCMA modulator 1170 that encodes a data symbol u, producing a SCMA symbol block 1172. SCMA symbol block 1172 is shown as including four tones, two of which are non-zero. However, other configurations are possible. Other configurations include different number of tones, as well as different number (and location) of non-zero tones. SCMA symbol block 1172 is provided to a block-wise space-time encoder 1175 which typically encodes SCMA symbol block 1172 a block at a time. Block-wise space-time encoder 1175 may also provide a diversity gain in addition to the coding gain. Block-wise space-time encoder 1175 may be able to utilize available space-time codes, with spreading being performed in multi-carrier time and/or frequency domains. It is also possible to achieve double domain diversity in both time and/or frequency and space domains. Transmitting device 1155 transmits the data symbol u as encoded by block-wise space-time encoder 1175.

Receiving device 1160 includes a joint block-wise space-time and SCMA decoder 1180 that jointly decodes a received version of the encoded data symbol u. Joint block-wise space-time and SCMA decoder 1180 may be able to jointly decode the data symbol u from the received version of the BWST symbol (or a block of multiplexed BWST symbols) and exploit the transmit diversity inherent in the space-time coding to recover from errors and/or interference present in the communications channel H.

Figure 12A:
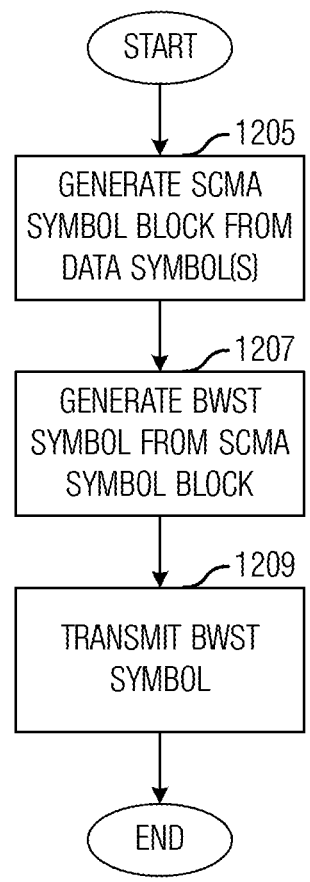
FIG. 12a illustrates an example flow diagram of operations occurring in a transmitting device as the transmitting device transmits data using block-wise space-time coding according to example embodiments described herein.

FIG. 12*a* illustrates a flow diagram of operations 1200 occurring in a transmitting device as the transmitting device transmits data using block-wise space-time coding. Operations 1200 may be indicative of operations occurring in a transmitting device, such as transmitting device 205, as the transmitting device transmits data using block-wise space-time (BWST) coding.

Operations 1200 may begin with the transmitting device generating a SCMA symbol block from data symbol(s) (block 1205). As an example, data symbol u (a part of a bit stream or data stream) may be mapped (or encoded) to produce a SCMA symbol block. The transmitting device may generate a BWST symbol from the SCMA symbol block (block 1207). The BWST symbol may be encoded from the SCMA symbol block a block at a time. Coding gain may be provided in addition to diversity gain. The transmitting device may transmit the BWST symbol (block 1209).

Figure 12B:
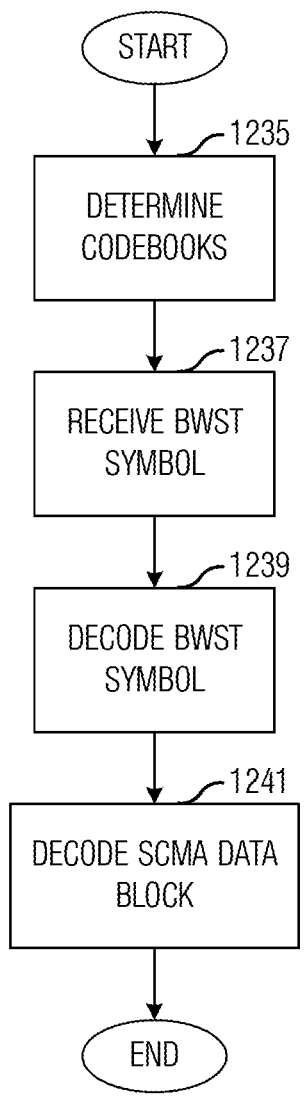
FIG. 12b illustrates an example flow diagram of operations occurring in a receiving device with low complexity as the receiving device receives data using block-wise space-time coding according to example embodiments described herein.

FIG. 12*b* illustrates a flow diagram of operations 1230 occurring in a receiving device with low complexity as the receiving device receives data using block-wise space-time coding. Operations 1230 may be indicative of operations occurring in a receiving device, such as receiving device 210, as the receiving device receives data using BWST coding.

Figure 12C:
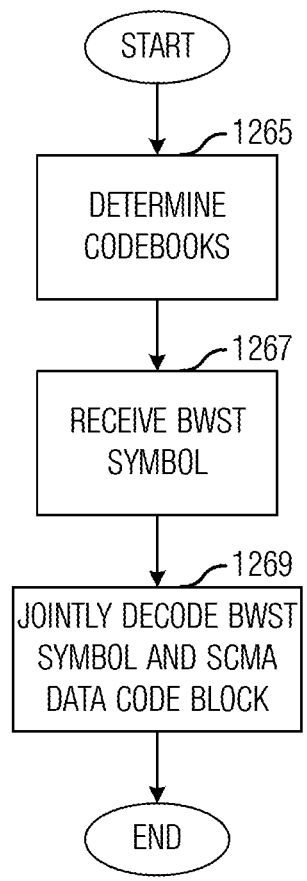
FIG. 12c illustrates an example flow diagram of operations occurring in a receiving device with high complexity as the receiving device receives data using block-wise space-time coding according to example embodiments described herein.

Operations 1230 may begin with the receiving device determining a plurality of codebooks (block 1235). The plurality of codebooks is associated with a transmitting device that is transmitting data to the receiving device. The receiving device may receive a BWST symbol or a block of multiplexed BWST symbols (block 1237). The receiving device may use a BWST decoder to decode the BWST symbol or block of multiplexed BWST symbols to produce one or more SCMA symbol blocks (block 1239). The receiving device may use a channel equalizer and SCMA decoder to recover a version of the data symbols from the one or more SCMA symbol block (block 1241). Blocks 1239 and 1241 may be collectively referred to as processing the BWST symbol using FIG. 12*c* illustrates a flow diagram of operations 1260 occurring in a receiving device with high complexity as the receiving device receives data using block-wise space-time coding. Operations 1260 may be indicative of operations occurring in a receiving device, such as receiving device 210, as the receiving device receives data using BWST coding.

Operations 1260 may begin with the receiving device determining a plurality of codebooks (block 1265). The plurality of codebooks is associated with a transmitting device that is transmitting data to the receiving device. The receiving device may receive a BWST symbol or a block of multiplexed BWST symbols (block 1267). The receiving device may use a joint BWST and SCMA decoder to jointly decode the BWST symbol or block of multiplexed BWST symbols to produce a version of the data symbols (block 1269).

Figure 13A:
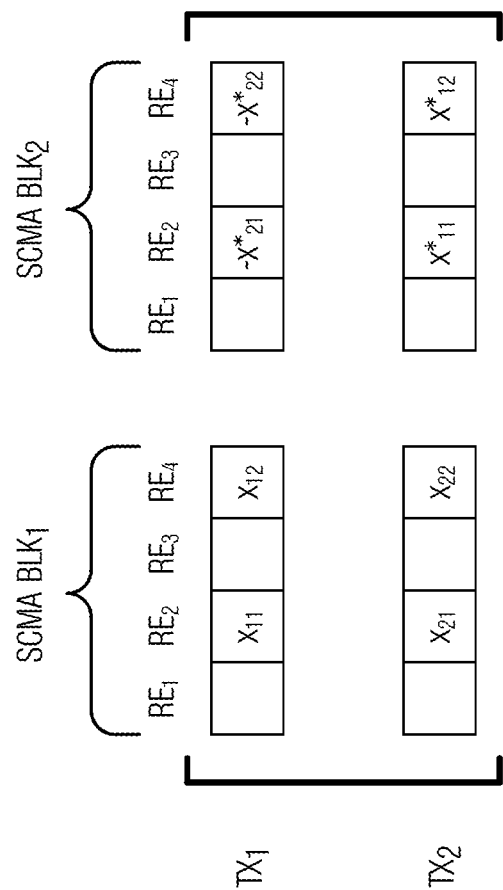
FIG. 13a illustrates an example symbol of an example MIMO SCMA OFDM communications system according to example embodiments described herein.

FIG. 13*a* illustrates a symbol 1300 of an example MIMO SCMA OFDM communications system. Symbol 1300 may be an example transmission block of a MIMO SCMA OFDM communications system with a transmission device with 2 transmit antenna and a receiving device with 1 receive antenna where the Alamouti algorithm is used. With such a configuration, a communications channel H between the transmitting device and the receiving device may be expressible as:

$$H = [h_1 h_2],$$

where $h_1$ is the communications channel for a first transmit antenna and $h_2$ is the communications channel for the second transmit antenna.

Symbol 1300 comprises two SCMA blocks, SCMA $BLK_1$ and SCMA $BLK_2$. Each SCMA block includes two SCMA codewords, one for each transmit antenna. As shown in FIG. 13*a*, a SCMA codeword comprises four resource elements (RE) with two REs being non-zero and two REs being zero. It is noted that other SCMA codeword configurations are possible, e.g., different number of REs, different number of non-zero REs, different number of zero REs, and the like.

Figure 13B:
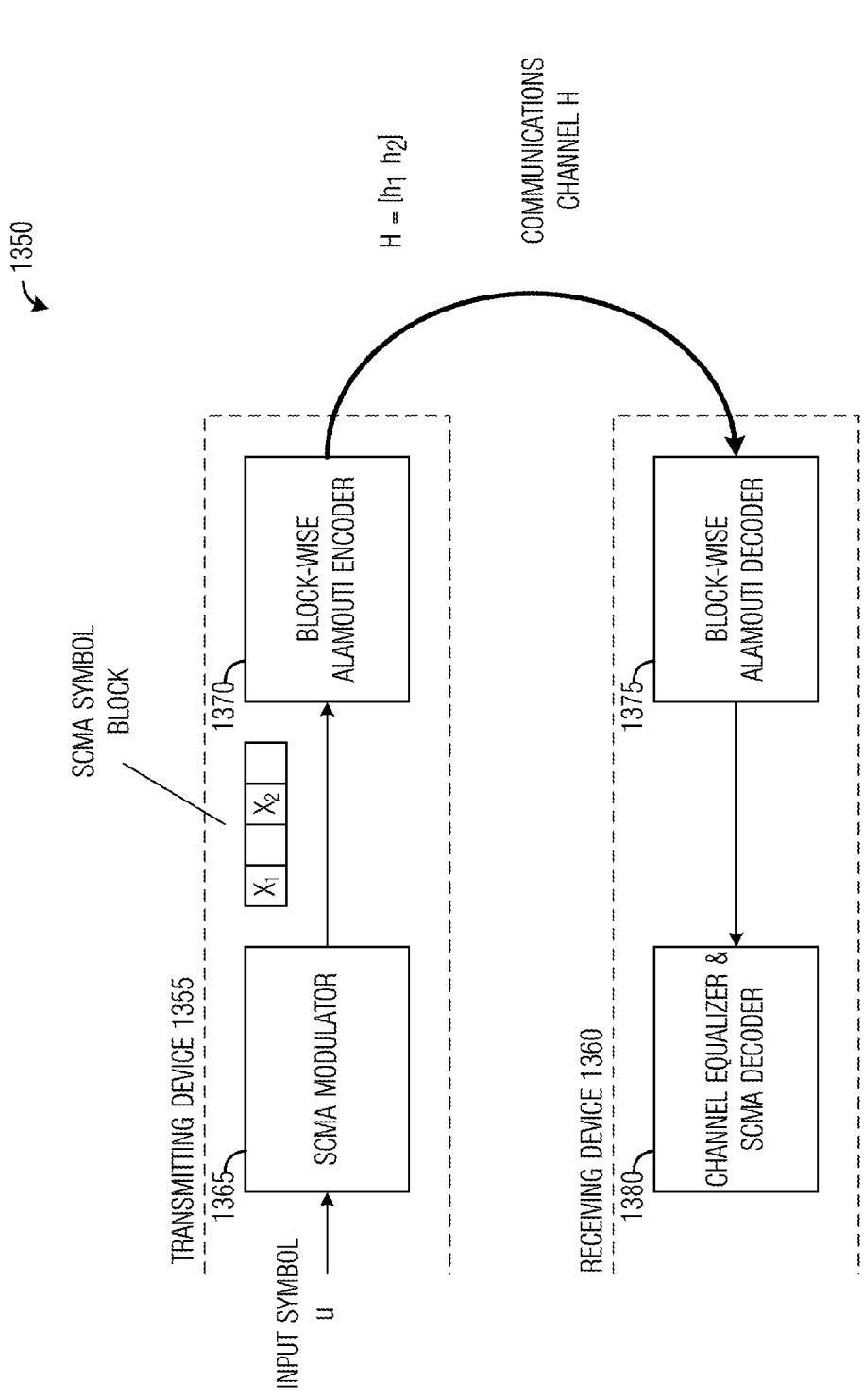
FIG. 13b illustrates an example model of a transmitting device-receiving device pair using an Alamouti algorithm for block-wise space-time coding according to example embodiments described herein.

FIG. 13*b* illustrates a model 1350 of a transmitting device-receiving device pair using an Alamouti algorithm for block-wise space-time coding. Model 1350 includes a transmitting device 1355 and a receiving device 1360 coupled together by a communications channel, H. Transmitting device 1355 and receiving device 1360 include circuitry to support transmit diversity for MIMO SCMA OFDM through the use of block-wise space-time coding using the Alamouti algorithm.

Transmitting device 1355 includes a SCMA modulator 1365 that encodes a data symbol u, producing a SCMA codeword. The SCMA codeword is shown as including four REs, two of which are non-zero. However, other configurations are possible. Other configurations include different number of REs, as well as different number (and location) of non-zero REs. The SCMA codeword is provided to a block-wise Alamouti encoder 1370 which typically encodes the SCMA codeword a block at a time. Block-wise Alamouti encoder 1370 may also provide a coding gain in addition to the diversity gain. Block-wise Transmitting device 1355 transmits the data symbol u as encoded by block-wise Alamouti encoder 1370. Receiving device 1360 includes a block-wise Alamouti decoder 1375 decodes a received version of the encoded data symbol u. Block-wise Alamouti decoder 1375 may be able to decode from the received version of the encoded data symbol u a version of the SCMA codeword. Block-wise Alamouti decoder 1375 may be able to exploit the transmit diversity inherent in the space-time coding to recover from errors and/or interference present in the communications channel H. A channel equalizer and SCMA decoder 1380 recovers the data symbol u from the version of the SCMA codeword. It is noted that with the use of the Alamouti algorithm, the equivalent channel for each symbol is expressible as:

$$\sqrt{|h_1|^2+|h_2|^2}.$$

According to another example embodiment, the channel equalization, block-wise Alamouti decoding and SCMA decoding may be performed jointly.

Figure 14:
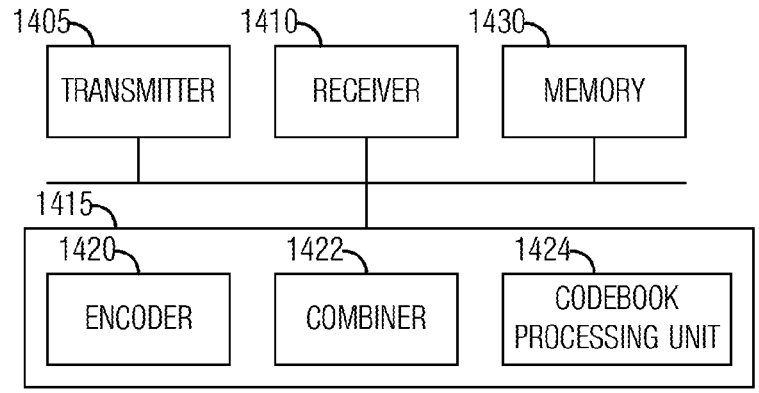
FIG. 14 illustrates an example first communications device according to example embodiments described herein.

FIG. 14 illustrates a first communications device 1400. Communications device 1400 may be an implementation of transmitting device, such as an eNB, an access point, a communications controller, a base station, and the like, or a UE, a mobile, a mobile station, a terminal, a user, a subscriber, and the like. Communications device 1400 may be used to implement various ones of the embodiments discussed herein. As shown in FIG. 14, a transmitter 1405 is configured to transmit packets, and the like, using open-loop CSM for MIMO SCMA OFDM. Communications device 1400 also includes a receiver 1410 that is configured to receive packets, and the like.

An encoder 1420 is configured to encode data layers for multiple transmit antennas using signature and/or codebook sets with each data layer being encoded with a sub-signature and/or subcodebook set. A combiner 1422 is configured to combine encoded data from encoder 1420 into output codewords. Combiner 1422 is configured to multiplex encoded data from multiple data layers into the output codewords or map encoded data from a single data layer into the output codewords. A codebook processing unit 1424 is configured to retrieve signature and/or codebook sets. Codebook processing unit 1424 is configured to select signature and/or codebook sets in accordance with mappings of transmitting devices and/or transmit antennas to signature and/or codebook sets. A memory 1430 is configured to store data, signature and/or codebook sets, mappings of signature and/or codebook sets to transmitting devices and/or transmit antennas, and the like.

The elements of communications device 1400 may be implemented as specific hardware logic blocks. In an alternative, the elements of communications device 1400 may be implemented as software executing in a processor, controller, application specific integrated circuit, or so on. In yet another alternative, the elements of communications device 1400 may be implemented as a combination of software and/or hardware.

As an example, receiver 1410 and transmitter 1405 may be implemented as a specific hardware block, while encoder 1420, combiner 1422, and codebook processing unit 1424 may be software modules executing in a microprocessor (such as processor 1415) or a custom circuit or a custom compiled logic array of a field programmable logic array. Encoder 1420, combiner 1422, and codebook processing unit 1424 may be modules stored in memory 1430.

Figure 15:
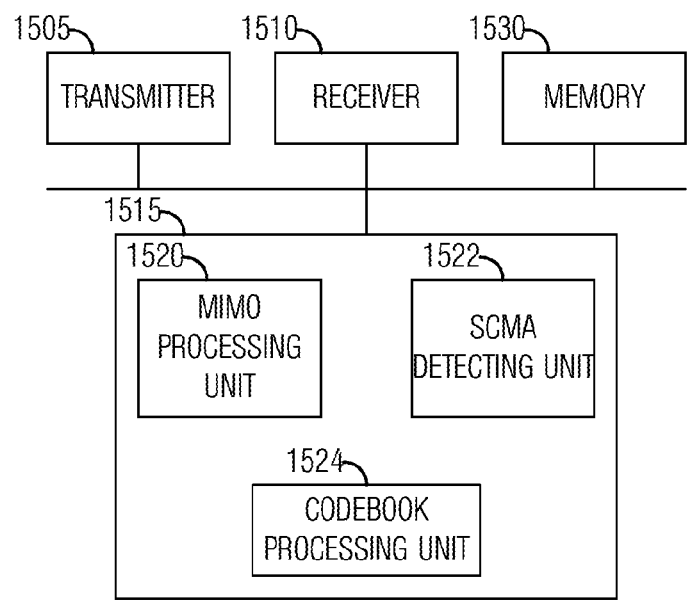
FIG. 15 illustrates an example second communications device according to example embodiments described herein.

FIG. 15 illustrates a second communications device 1500. Communications device 1500 may be an implementation of receiving device, such as a UE, a mobile, a mobile station, a terminal, a user, a subscriber, and the like, or an eNB, an access point, a communications controller, a base station, and the like. Communications device 1500 may be used to implement various ones of the embodiments discussed herein. As shown in FIG. 15, a transmitter 1505 is configured to transmit packets, and the like. Communications device 1500 also includes a receiver 1510 that is configured to receive packets, and the like, using open-loop CSM for MIMO SCMA OFDM.

A MIMO processing unit 1520 is configured to separate different data layers present in a received signal. MIMO processing unit 1520 may use a MMSE algorithm, a MRC algorithm, and the like, to separate the different data layers. A SCMA detecting unit 1522 is configured to detect codewords present in the received signal (or different data layers of the received signal) to recover data transmitted to communications device 1500. SCMA detecting unit 1522 may use a low complexity algorithm, such as MPA, turbo decoding, and the like, to recover the data. It is noted that MIMO processing unit 1520 and SCMA detecting unit 1522 may be implemented as separate units or a single combination unit. A codebook processing unit 1524 is configured to determine potentially active signature and/or codebook sets. A memory 1530 is configured to store data, signature and/or codebook sets, mappings of signature and/or codebook sets to transmitting devices and/or transmit antennas, and the like.

The elements of communications device 1500 may be implemented as specific hardware logic blocks. In an alternative, the elements of communications device 1500 may be implemented as software executing in a processor, controller, application specific integrated circuit, or so on. In yet another alternative, the elements of communications device 1400 may be implemented as a combination of software and/or hardware.

As an example, receiver 1510 and transmitter 1505 may be implemented as a specific hardware block, while MIMO processing unit 1520, SCMA detecting unit 1522, and codebook processing unit 1524 may be software modules executing in a microprocessor (such as processor 1515) or a custom circuit or a custom compiled logic array of a field programmable logic array. MIMO processing unit 1520, SCMA detecting unit 1522, and codebook processing unit 1524 may be modules stored in memory 1530.

Figure 16:
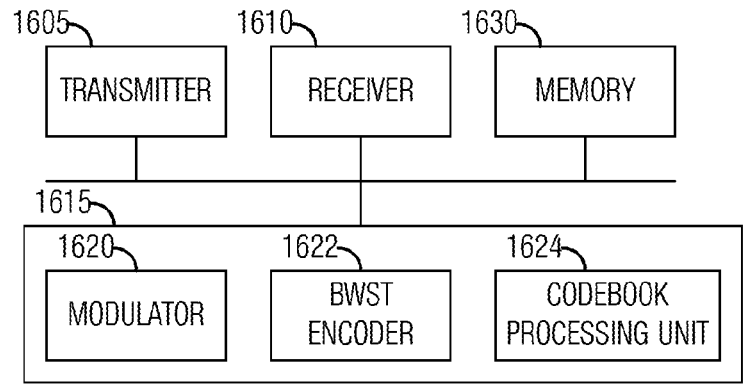
FIG. 16 illustrates an example third communications device according to example embodiments described herein.

FIG. 16 illustrates a third communications device 1600. Communications device 1400 may be an implementation of transmitting device, such as an eNB, an access point, a communications controller, a base station, and the like, or a UE, a mobile, a mobile station, a terminal, a user, a subscriber, and the like. Communications device 1600 may be used to implement various ones of the embodiments discussed herein. As shown in FIG. 16, a transmitter 1605 is configured to transmit packets, and the like, using BWST SCMA OFDM. Communications device 1600 also includes a receiver 1610 that is configured to receive packets, and the like.

A modulator 1620 is configured to encode data layers for multiple transmit antennas using signature and/or codebook sets with each data layer being encoded with a sub-signature and/or subcodebook set. A BWST encoder 1622 is configured to combine SCMA symbol blocks (encoded data) from modulator 1620 into output codewords. BWST encoder 1622 is configured to combine the SCMA symbol blocks from multiple data layers into the output codewords or the SCMA symbol block from a single data layer into the output codewords. A codebook processing unit 1624 is configured to retrieve signature and/or codebook sets. Codebook processing unit 1624 is configured to select signature and/or codebook sets in accordance with mappings of transmitting devices and/or transmit antennas to signature and/or codebook sets. A memory 1630 is configured to store data, signature and/or codebook sets, mappings of signature and/or codebook sets to transmitting devices and/or transmit antennas, and the like.

The elements of communications device 1600 may be implemented as specific hardware logic blocks. In an alternative, the elements of communications device 1600 may be implemented as software executing in a processor, controller, application specific integrated circuit, or so on. In yet another alternative, the elements of communications device 1600 may be implemented as a combination of software and/or hardware.

As an example, receiver 1610 and transmitter 1605 may be implemented as a specific hardware block, while modulator 1620, BWST encoder 1622, and codebook processing unit 1624 may be software modules executing in a microprocessor (such as processor 1615) or a custom circuit or a custom compiled logic array of a field programmable logic array. Modulator 1620, BWST encoder 1622, and codebook processing unit 1624 may be modules stored in memory 1630.

Figure 17:
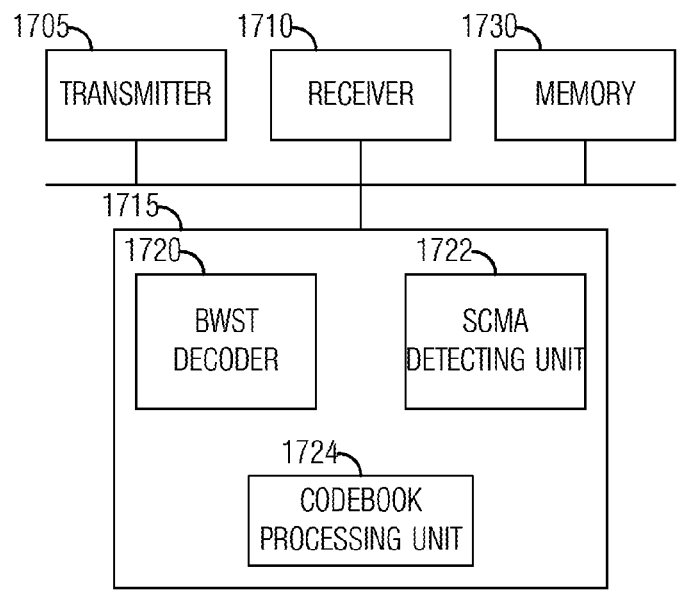
FIG. 17 illustrates an example fourth communications device according to example embodiments described herein.

FIG. 17 illustrates a fourth communications device 1700. Communications device 1700 may be an implementation of receiving device, such as a UE, a mobile, a mobile station, a terminal, a user, a subscriber, and the like, or an eNB, an access point, a communications controller, a base station, and the like. Communications device 1700 may be used to implement various ones of the embodiments discussed herein. As shown in FIG. 17, a transmitter 1705 is configured to transmit packets, and the like. Communications device 1700 also includes a receiver 1710 that is configured to receive packets, and the like, using BWST SCMA OFDM.

A BWST decoder 1720 is configured to separate different data layers present in a received signal. BWST decoder 1720 may use the Alamouti algorithm, and the like, to separate the different data layers. A SCMA detecting unit 1722 is configured to detect codewords present in the received signal (or different data layers of the received signal) to recover data transmitted to communications device 1700. SCMA detecting unit 1722 may use a low complexity algorithm, such as MPA, turbo decoding, and the like, to recover the data. It is noted BWST decoder 1720 and SCMA detecting unit 1722 may be implemented as separate units or a single combination unit. A codebook processing unit 1724 is configured to determine potentially active signature and/or codebook sets. A memory 1730 is configured to store data, signature and/or codebook sets, mappings of signature and/or codebook sets to transmitting devices and/or transmit antennas, and the like.

The elements of communications device 1700 may be implemented as specific hardware logic blocks. In an alternative, the elements of communications device 1700 may be implemented as software executing in a processor, controller, application specific integrated circuit, or so on. In yet another alternative, the elements of communications device 1700 may be implemented as a combination of software and/or hardware.

As an example, receiver 1710 and transmitter 1705 may be implemented as a specific hardware block, while BWST decoder 1720, SCMA detecting unit 1722, and codebook processing unit 1724 may be software modules executing in a microprocessor (such as processor 1715) or a custom circuit or a custom compiled logic array of a field programmable logic array. BWST decoder 1720, SCMA detecting unit 1722, and codebook processing unit 1724 may be modules stored in memory 1730.

Advantageous features of the embodiments may include: a transmitting device including a processor and a transmitter operatively coupled to the processor. The processor configured to map a coded information bit stream intended for a transmit antenna onto at least one spreading sequence of a plurality of spreading sequences to produce a data stream, and to encode the data stream using a space-time code to produce a symbol block; and the transmitter configured to transmit the symbol block. The processor is also configured to encode the coded information bit stream by selecting the at least one spreading sequence from the plurality of spreading sequences to produce the data stream. The processor is also configured to encode one portion of the coded information bit stream for a first data layer by selecting a first spreading sequence from a first subset of the plurality of spreading sequences corresponding to the first data layer, to encode another portion of the coded information bit stream for a second data layer by selecting a second spreading sequence from a second subset of the plurality of spreading sequences corresponding to the second data layer, and to combine the first spreading sequence and the second spreading sequence to produce the data stream.

Advantageous features of the embodiments may include: a receiving device including a processor and a receiver operatively coupled to the processor. The processor configured to determining a plurality of codebooks, wherein the plurality of codebooks is associated with a transmitting device transmitting data to the receiving device, to decode a symbol block using a space-time code to produce a codespace symbol, and to process the codespace symbol using the plurality of codebooks to recover the data. The receiver configured to receive a symbol block from the transmitting device. The processor is also configured to decode the symbol block using an Alamouti algorithm. The processor is also configured to despread the symbol block in at least one of a frequency domain and a time domain.

Although the present disclosure and its advantages have been described in detail, it should be understood that various changes, substitutions and alterations can be made herein without departing from the spirit and scope of the disclosure as defined by the appended claims.

What is claimed is:

1. A method for transmitting data, the method comprising:
   mapping, by a transmitting device, a first coded information bit stream intended for a first transmit antenna onto at least one first spreading sequence of a plurality of first spreading sequences to generate a first data stream, wherein mapping the first coded information bit stream comprises:
   mapping one portion of the first coded information bit stream for a first data layer by selecting a third spreading sequence from a first subset of the plurality of first spreading sequences associated with the first data layer;
   mapping another portion of the first coded information bit stream for a second data layer by selecting a fourth spreading sequence from a second subset of the plurality of first spreading sequences associated with the second data layer; and
   combining the third spreading sequence and the fourth spreading sequence to produce the first data stream;
   mapping, by the transmitting device, a second coded information bit stream intended for a second transmit antenna onto at least one second spreading sequence of a plurality of second spreading sequences to generate a second data stream; and transmitting, by the transmitting device, the first data stream and the second data stream on respective transmit antennas.

2. The method of claim 1, wherein the plurality of first spreading sequences and the plurality of second spreading sequences comprise low density sequence (LDS) signatures.

3. The method of claim 1, wherein the plurality of first spreading sequences and the plurality of second spreading sequences comprise codewords of sparse code multiple access (SCMA) codebooks.

4. The method of claim 1, wherein mapping the first coded information bit stream comprises:
mapping the first coded information bit stream by selecting the at least one first spreading sequence from the plurality of first spreading sequences to produce the first data stream.

5. The method of claim 1, further comprising:
selecting the first subset of the plurality of first spreading sequences for the first transmit antenna; and
selecting the second subset of the plurality of first spreading sequences for the second transmit antenna.

6. The method of claim 1, wherein combining the third spreading sequence and the fourth spreading sequence to produce the first data stream comprises multiplexing the third spreading sequence and the fourth spreading sequence.

7. The method of claim 1, wherein the first subset and the second subset are disjoint.

8. The method of claim 1, wherein the first data stream and the second data stream are transmitted to a single receiving device.

9. The method of claim 1, wherein the first data stream and the second data stream are transmitted to different receiving devices.

10. The method of claim 1, wherein the first transmit antenna and the second transmit antenna are antennas of the transmitting device.

11. The method of claim 1, wherein the mapping the second coded information bit stream and the transmitting the second data stream are performed by a second transmitting device, the second transmit antenna being an antenna of the second transmitting device.

12. The method of claim 1, further comprising:
precoding the first data stream with a first precoder; and
precoding the second data stream with a second precoder, wherein the first precoder and the second precoder are selected to reduce interference to receiving devices that are not intended recipients of the first data stream and the second data stream.

13. The method of claim 1, further comprising:
precoding the first data stream and the second data streams with a third precoder, wherein the third precoder is selected to reduce interference to receiving devices that are not intended recipients of the first data stream and the second data stream.

14. A method for transmitting data, the method comprising:
mapping, by a transmitting device, a coded information bit stream intended for a transmit antenna onto at least one spreading sequence of a plurality of spreading sequences to produce a data stream, wherein mapping the coded information bit stream comprises:
mapping one portion of the coded information bit stream for a first data layer by selecting a first spreading sequence from a first subset of the plurality of spreading sequences corresponding to the first data layer;
mapping another portion of the coded information bit stream for a second data layer by selecting a second spreading sequence from a second subset of the plurality of spreading sequences corresponding to the second data layer; and
combining the first spreading sequence and the second spreading sequence to produce the data stream;
encoding, by the transmitting device, the data stream using a space-time code to produce a symbol block; and
transmitting, by the transmitting device, the symbol block.

15. The method of claim 14, wherein the encoding spreads the data stream in at least one of a frequency domain and a time domain.

16. The method of claim 14, wherein mapping the coded information bit stream comprises:
mapping the coded information bit stream by selecting the at least one spreading sequence from the plurality of spreading sequences to produce the data stream.

17. The method of claim 14, wherein the encoding is performed using an Alamouti algorithm.

18. A transmitting device comprising:
a processor configured to map a first coded information bit stream intended for a first transmit antenna onto at least one first spreading sequence of a plurality of first spreading sequences to generate a first data stream, and to map a second coded information bit stream intended for a second transmit antenna onto at least one second spreading sequence of a plurality of second spreading sequences to generate a second data stream; and
a transmitter operatively coupled to the processor, the transmitter configured to transmit the first data stream and the second data stream on respective transmit antennas;
wherein the processor is configured to map one portion of the first coded information bit stream for a first data layer by selecting a third spreading sequence from a first subset of the plurality of first spreading sequences associated with the first data layer, to map another portion of the first coded information bit stream for a second data layer by selecting a fourth spreading sequence from a second subset of the plurality of first spreading sequences associated with the second data layer, and to combine the third spreading sequence and the fourth spreading sequence to produce the first data stream.

19. The transmitting device of claim 18, wherein the processor is configured to map the first coded information bit stream by selecting the at least one first spreading sequence from the plurality of first spreading sequences to produce the first data stream.

20. The transmitting device of claim 18, wherein the processor is configured to select the first subset of the plurality of first spreading sequences for the first transmit antenna, and to select the second subset of the plurality of first spreading sequences for the second transmit antenna.

21. The transmitting device of claim 18, wherein the processor is configured to precode the first data stream with a first precoder, and to precode the second data stream with a second precoder, wherein the first precoder and the second precoder are selected to reduce interference to receiving devices that are not intended recipients of the first data stream and the second data stream.

22. The transmitting device of claim 18, wherein the processor is configured to precode the first data stream and the second data streams with a precoder, wherein the precoder is selected to reduce interference to receiving devices that are not intended recipients of the first data stream and the second data stream.

23. The transmitting device of claim 18, wherein the plurality of first spreading sequences and the plurality of second spreading sequences comprise low density sequence (LDS) signatures.

24. The transmitting device of claim 18, wherein the plurality of first spreading sequences and the plurality of second spreading sequences comprise codewords of sparse code multiple access (SCMA) codebooks.

25. The transmitting device of claim 18, wherein the processor configured to combine the third spreading sequence and the fourth spreading sequence to produce the first data stream comprises the processor configured to multiplex the third spreading sequence and the fourth spreading sequence.

26. The transmitting device of claim 18, wherein the first subset and the second subset are disjoint.

27. The transmitting device of claim 18, wherein transmitter configured to transmit comprises the transmitter configured to transmit the first data stream and the second data stream to a single receiving device.

28. The transmitting device of claim 18, wherein transmitter configured to transmit comprises the transmitter configured to transmit the first data stream and the second data stream to different receiving devices.

29. The transmitting device of claim 18, wherein the first transmit antenna and the second transmit antenna are antennas of the transmitting device.

30. The transmitting device of claim 18, further comprising a second processor and a second transmitter operatively coupled to the second processor, the second processor configured to map the second coded information bit stream, the second transmitted configured to transmit the second data stream on the second antenna.

31. A transmitting device comprising:
a processor configured to map a coded information bit stream intended for a transmit antenna onto at least one spreading sequence of a plurality of spreading sequences to produce a data stream, and to encode the data stream using a space-time code to produce a symbol block; and
a transmitter operatively coupled to the processor, the transmitter configured to transmit the symbol block;
wherein the processor configured to map the coded information bit stream comprises the processor configured to:
map one portion of the coded information bit stream for a first data layer by selecting a first spreading sequence from a first subset of the plurality of spreading sequences corresponding to the first data layer;
map another portion of the coded information bit stream for a second data layer by selecting a second spreading sequence from a second subset of the plurality of spreading sequences corresponding to the second data layer; and
combine the first spreading sequence and the second spreading sequence to produce the data stream.

32. The transmitting device of claim 31, wherein the processor configured to encode comprises the processor configured to spread the data stream in at least one of a frequency domain and a time domain.

33. The transmitting device of claim 31, wherein the processor configured to map the coded information bit stream comprises the processor configured to select the at least one spreading sequence from the plurality of spreading sequences to produce the data stream.

34. The transmitting device of claim 31, wherein the processor configured to encode comprises the processor configured to use an Alamouti algorithm.

\* \* \* \* \*